US010965913B2

(12) United States Patent
Matsumoto et al.

(10) Patent No.: US 10,965,913 B2
(45) Date of Patent: Mar. 30, 2021

(54) MONITORING APPARATUS, MONITORING SYSTEM AND MONITORING METHOD

(71) Applicant: PANASONIC INTELLECTUAL PROPERTY MANAGEMENT CO., LTD., Osaka (JP)

(72) Inventors: Yuichi Matsumoto, Kanagawa (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1107 days.

(21) Appl. No.: 14/813,494

(22) Filed: Jul. 30, 2015

(65) Prior Publication Data
US 2016/0063712 A1 Mar. 3, 2016

(30) Foreign Application Priority Data

Aug. 27, 2014 (JP) .............................. JP2014-172778

(51) Int. Cl.
*H04N 7/18* (2006.01)
*G06K 9/00* (2006.01)

(52) U.S. Cl.
CPC ......... *H04N 7/183* (2013.01); *G06K 9/00771* (2013.01); *H04N 7/18* (2013.01);
(Continued)

(58) Field of Classification Search
CPC ...... G06K 9/00771; G06T 2207/10016; G06T 2207/30196; G06T 2207/30232;
(Continued)

(56) References Cited

U.S. PATENT DOCUMENTS 6,774,905 B2 *  8/2004  Elfving ................. G06T 7/0002
                                                    345/421
8,098,888 B1 *  1/2012  Mummareddy ... G06K 9/00778
                                                    382/103
(Continued)

FOREIGN PATENT DOCUMENTS

JP   2003-101994   4/2003
JP   2004-133805   4/2004
(Continued)

OTHER PUBLICATIONS

Japanese Office action issued in JP Application No. 2014-172778, dated Jun. 23, 2015.
(Continued)

*Primary Examiner* — Farhan Mahmud
(74) *Attorney, Agent, or Firm* — Greenblum & Bernstein, P.L.C.

(57) ABSTRACT

A person is detected from a moving image of the monitoring area, and position information on the person is acquired. Temporal statistical processing is performed on the position information, statistical information relating to a staying situation of the person is acquired in accordance with setting of a target period of time for the statistical processing, and thus a heat map moving image is generated. Furthermore, a mask image corresponding to a person image area is generated at every predetermined point in time based on the position information on the person. A monitoring moving image that results from superimposing the heat map image and the mask image onto a background image is generated and is output at every predetermined point in time.

15 Claims, 15 Drawing Sheets

(52) U.S. Cl.
CPC ............. *G06T 2207/20076* (2013.01); *G06T 2207/30196* (2013.01); *G06T 2207/30232* (2013.01)

(58) Field of Classification Search
CPC ... G06T 7/194; G06T 7/20; G06T 7/11; G06T 7/246; G06T 2207/30201; G06T 2207/30241; H04N 7/181; H04N 7/18; H04N 5/23219; H04N 5/272; G08B 13/19608
See application file for complete search history.

(56) References Cited

U.S. PATENT DOCUMENTS

| | | |
|---|---|---|
| 9,165,212 B1 | 10/2015 | Watanabe et al. |
| 2009/0134968 A1 | 5/2009 | Girgensohn et al. |
| 2010/0026802 A1 | 2/2010 | Titus et al. |
| 2015/0103174 A1 | 4/2015 | Emura et al. |
| 2015/0120237 A1 | 4/2015 | Gouda et al. |
| 2015/0278608 A1 | 10/2015 | Matsumoto et al. |

FOREIGN PATENT DOCUMENTS

| | | |
|---|---|---|
| JP | 2007-180709 | 7/2007 |
| JP | 2009-134688 | 6/2009 |
| JP | 2013-186838 | 9/2013 |
| JP | 5597781 B | 10/2014 |
| JP | 2015-087841 | 5/2015 |
| WO | 2009/017687 A1 | 2/2009 |

OTHER PUBLICATIONS

The Extended European Search Report dated Feb. 9, 2016 for the related European Patent Application No. 15176700.1.

Parzych M et al: "Automatic people density maps generation with use of movement detection analysis", 2013 6th International Conference on Human System Interactions (HSI), IEEE, Jun. 6, 2013 (Jun. 6, 2013), pp. 26-31.

* cited by examiner

FIG. 3A
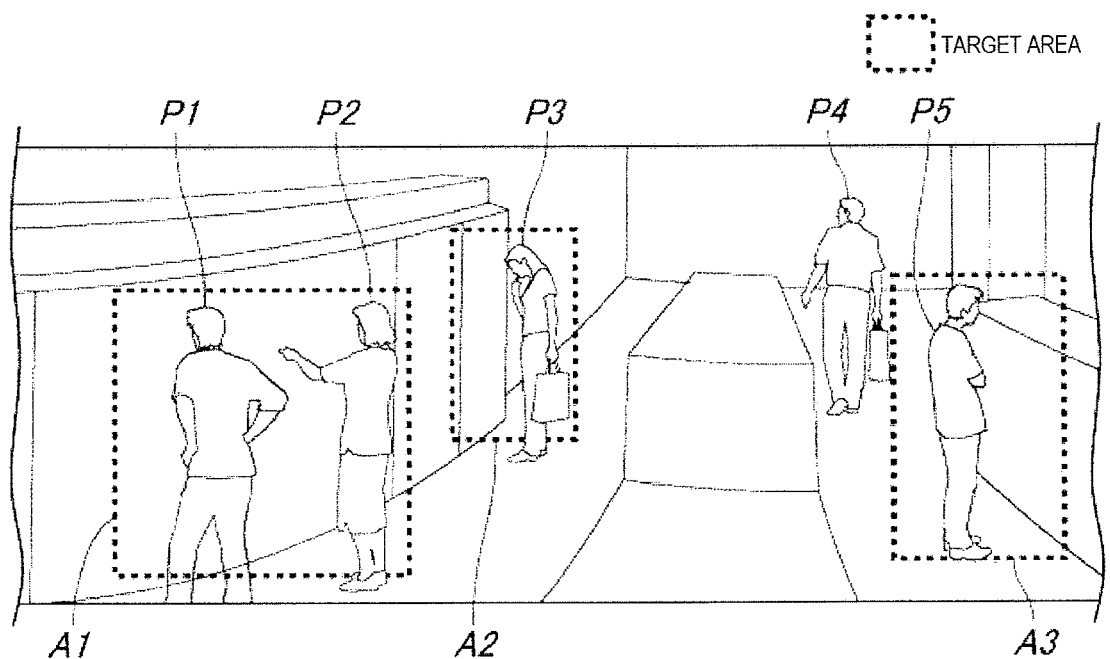
FIG. 3B
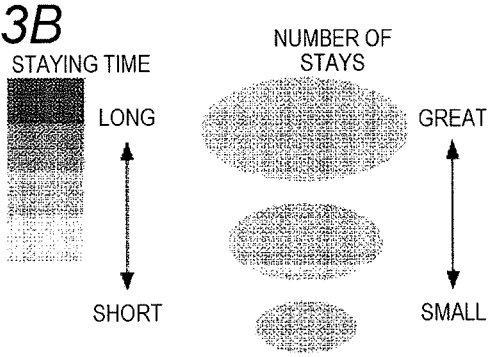
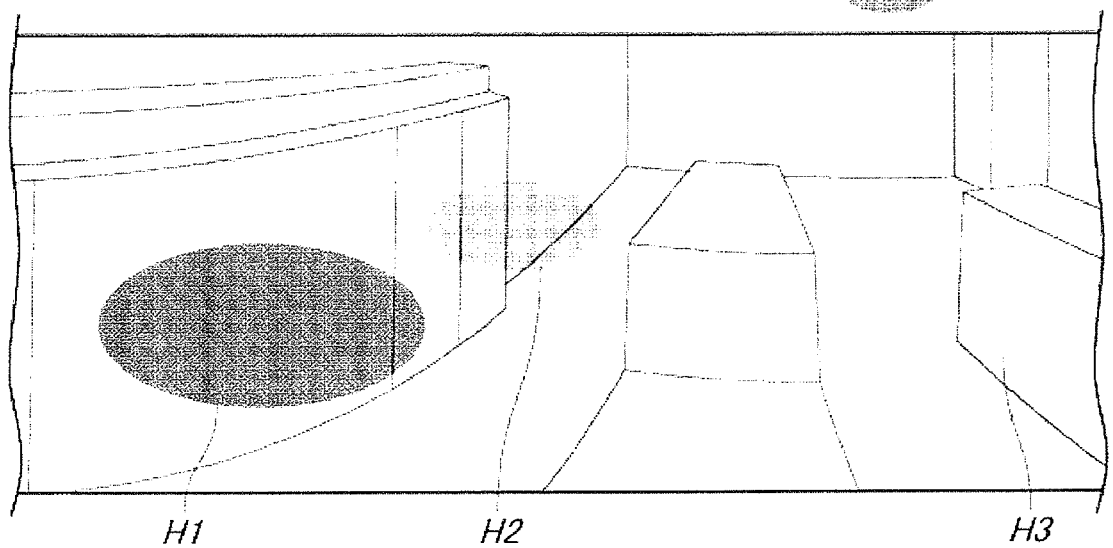

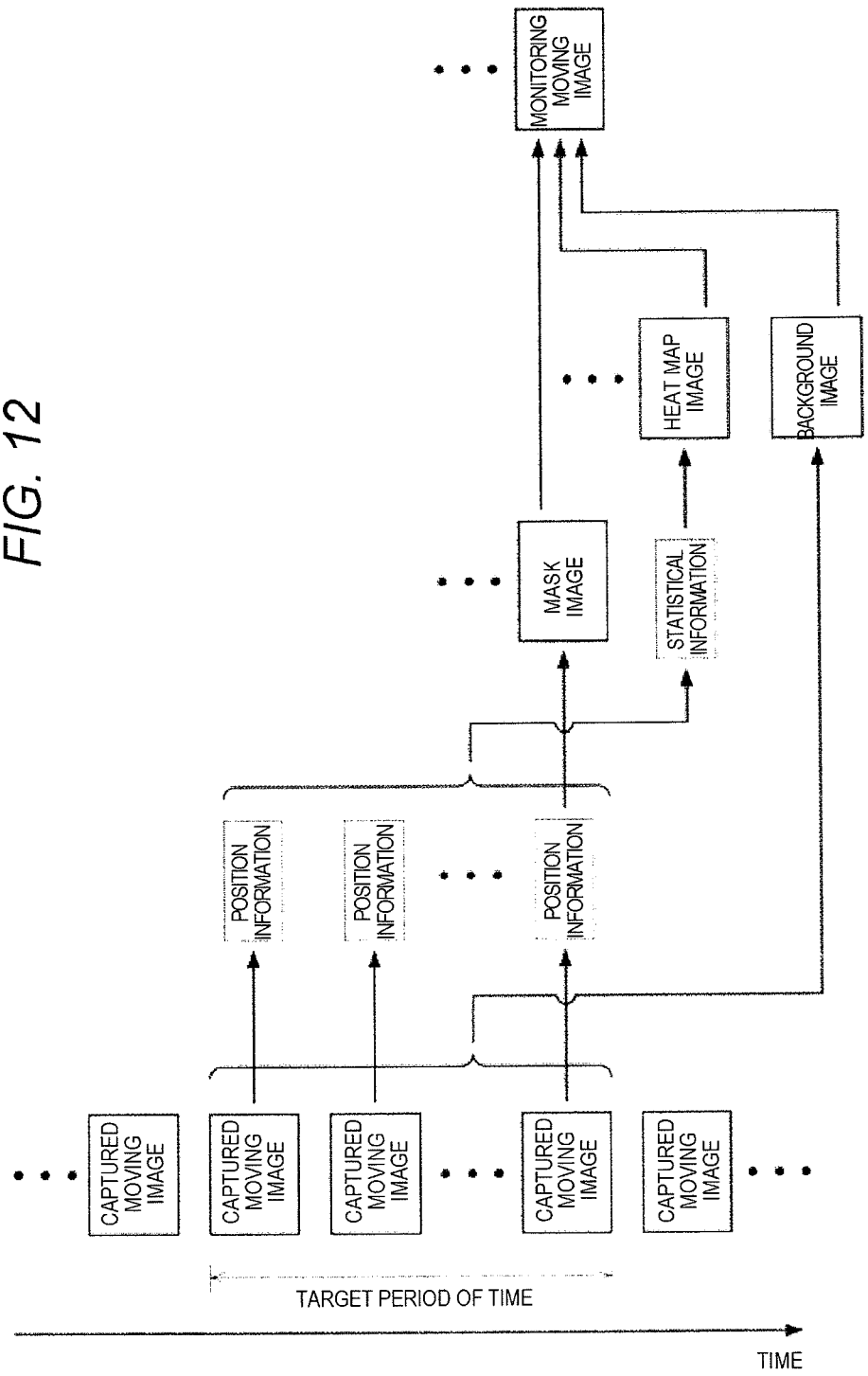

FIG. 14A
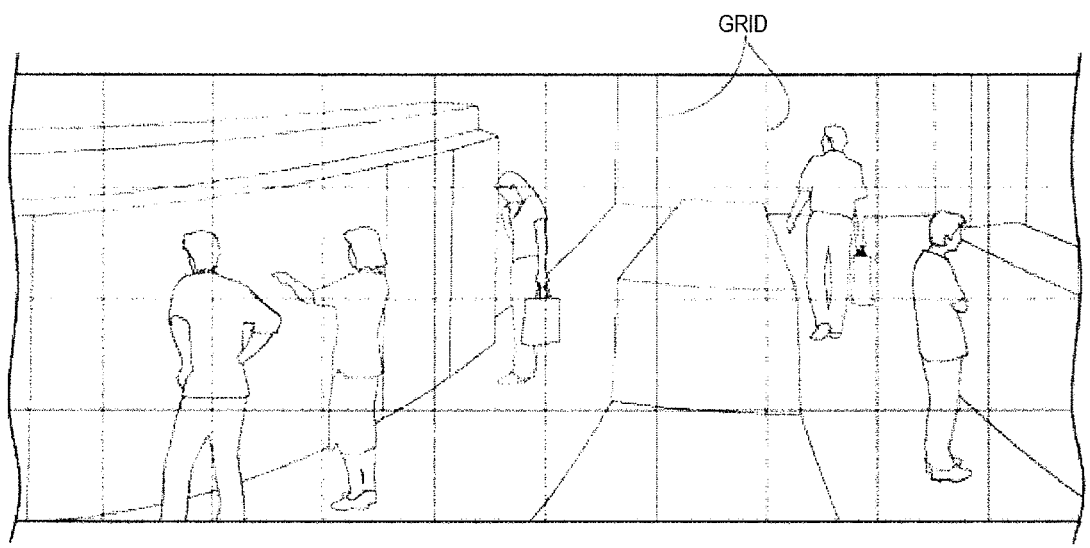
FIG. 14B
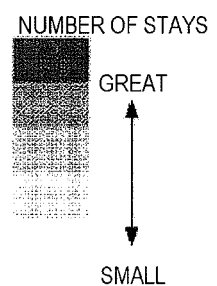
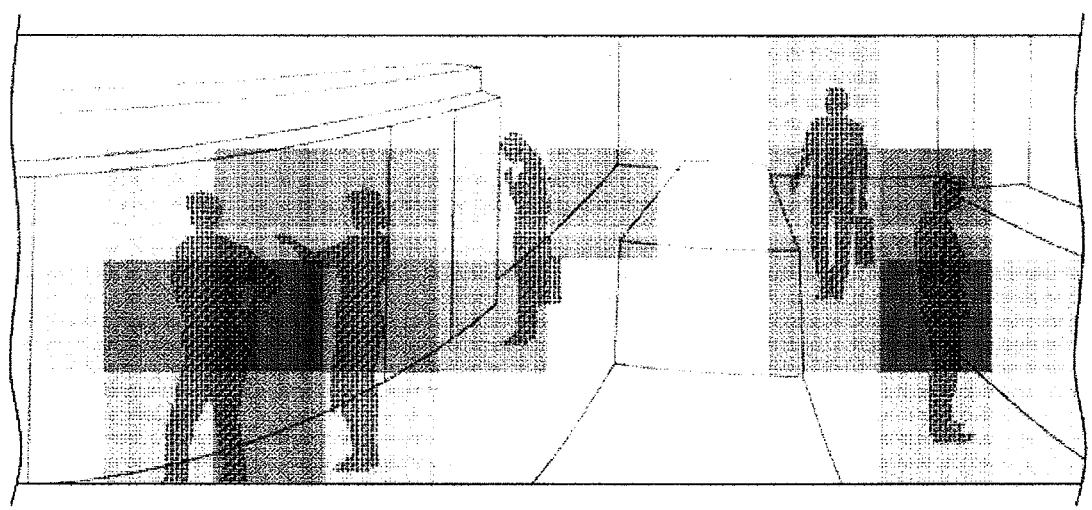

MONITORING APPARATUS, MONITORING SYSTEM AND MONITORING METHOD

BACKGROUND OF THE INVENTION

1. Field of the Invention

The present invention relates to a monitoring apparatus, a monitoring system, and a monitoring method, in each of which of a monitoring moving image that results from superimposing a foreground image showing an activity situation of a moving object in a monitoring area onto a background image is generated and is output.

2. Description of the Related Art

In a store such as a convenience store, an improvement plan for managing the store is considered based on analysis relating to a behavior of a customer within the store, but the analysis is useful for planning to achieve an improvement in customer satisfaction or efficient store management and for improving a sales volume of or a profit of the store. On the other hand, in the store such as the convenience store, a monitoring system, in which a situation within the store is monitored using a moving image that is captured by a camera which is installed to capture a moving image of the inside of the store, has come into wide use, and when information relating to an activity situation of the customer within the store is set to be acquired, the customer behavior analysis can be more efficiently performed using the moving image captured by the camera.

As a technology that acquires the information relating to the activity situation of a person using the moving image captured by this camera, in the related art, a technology is known that acquires the information relating to the activity situation of the person in a monitoring area from multiple cameras and generates a heat map image that results from visualizing the activity situation (refer to Japanese Patent Unexamined Publication No. 2009-134688). With this technology, the heat map image is set to be color-coded into the shape of a contour in accordance with the extent of the activity of the person and to be displayed in a state of being superimposed onto a layout drawing of the monitoring area.

Furthermore, a technology is known that sets multiple measurement areas (cells) to be on a moving image captured by the camera, acquires a value indicating a crowded situation or a staying situation from a motion of the persons, in each of the multiple measurement areas, and according to the value, and performs coloring on a measurement area (refer to Japanese Patent Unexamined Publication No. 2007-180709). With this technology, an image that results from performing the coloring on every measurement area can be considered to be a heat map image, and thus the crowded situation or the staying situation in the measurement area can be known immediately.

Furthermore, in a case where a moving image that is captured by the camera is browsed through for the purpose of the monitoring for protection against crime or disaster, no problem occurs, but in a case where the moving image captured by the camera is used for purposes other than the monitoring, such as the customer behavior analysis described above, there is a need to protect the privacy of the customer.

To address this desire to protect customer privacy, in the related art, a technology is known that changes an image area of a person within a moving image captured in a camera to a specific mask image and displays a result of the changing (refer to Japanese Patent Unexamined Publication No. 2013-186838). Particularly, with this technology, feature points are displayed on the mask image, and thus a body motion of the person is easily known.

As is the case with the technologies disclosed in Japanese Patent Unexamined Publication Nos. 2009-134688 and 2007-180709, in the heat map image that results from visualizing an activity situation of the person, the extent to which the customer is interested in a commodity on a display shelf can be known from the activity situation of the person in the vicinity of the display shelf, the commodity on which receives the customer's attention. Furthermore, because the heat map image is generated based on information that is aggregated during a predetermined period of time, with the heat map image, the activity situation of the person during the predetermined period of time can be easily known using the heat map image.

On the other hand, as is the case with the technology disclosed in Japanese Patent Unexamined Publication No. 2013-186838, when the person moving image area is changed to a specific mask image and a result of the change is displayed, in addition the protection of the customer privacy, an advantage can be obtained that the activity situation of the person can be easily known because a background and a person are easy to identify. Particularly, with this mask image, the activity situation of the person can be easily known at a certain moment.

With the customer behavior analysis, it is expected that the activity situation of the person during a predetermined period of time is known and that the activity situation of the person at a certain moment is known. Particularly, when the activity situation of the person during the predetermined period of time and the activity situation of the person at the certain moment are set to be known at the same time using one monitoring screen, a job of the customer behavior analysis can be greatly optimized.

SUMMARY OF THE INVENTION

According to an aspect of the present invention, there is provided a monitoring apparatus that generates and outputs a monitoring moving image that results from superimposing a foreground image showing an activity situation of a moving object in a monitoring area onto a background image, the monitoring apparatus including: a position information acquirer that detects a moving object from a moving image of the monitoring area and acquires position information on every moving object; a statistical information acquirer that performs temporal statistical processing on the position information acquired by the position information acquirer and acquires statistical information relating to a staying situation of the moving object in accordance with setting of a target period of time for the statistical processing; a first foreground image generator that generates a first foreground image that results from visualizing the statistical information acquired by the statistical information acquirer; a second foreground image generator that generates a second foreground image corresponding to an image area of the moving object at every predetermined point in time based on the position information acquired by the positional information acquirer; and a moving image output controller that generates and outputs the monitoring moving image that results from superimposing the first and second foreground images that are generated by the first and second foreground image generators, respectively, onto the background image at every predetermined point in time.

BRIEF DESCRIPTION OF DRAWINGS

FIG. 3A is an explanatory diagram for describing an outline of processing that is performed in a PC;

FIG. 3B is an explanatory diagram for describing an outline of the processing that is performed in the PC;

FIG. 12 is an explanatory diagram for describing an outline of processing that is performed in each unit of a PC;

FIG. 14A is an explanatory diagram illustrating a heat map image that is an area division type according to a second embodiment;

FIG. 14B is an explanatory diagram illustrating the heat map image that is the area division type according to the second embodiment.

DETAILED DESCRIPTION OF THE PREFERRED EMBODIMENTS

Figure 1:
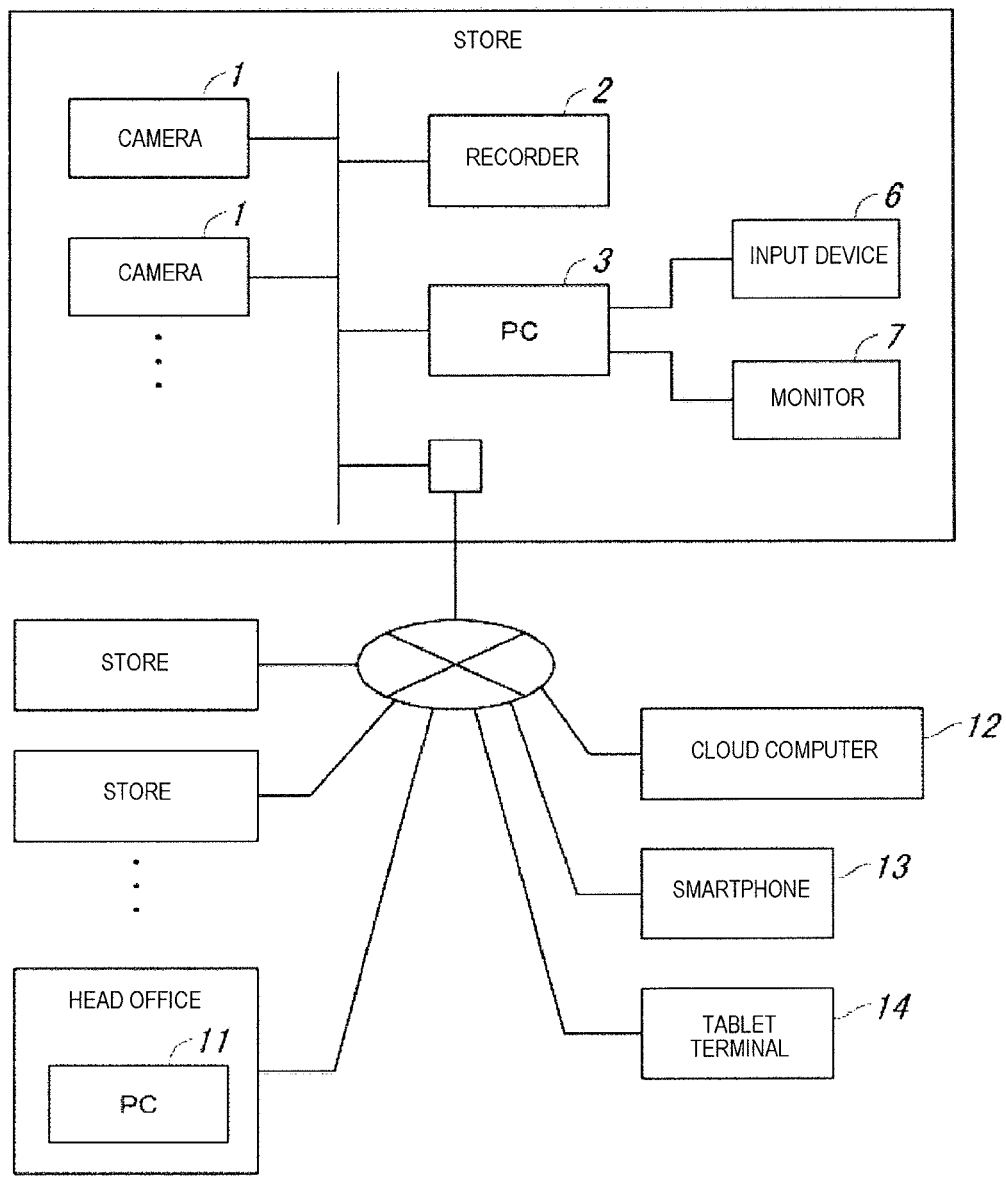
FIG. 1 is a diagram illustrating an entire configuration of a monitoring system according to a first embodiment.

A main object of the present invention, which is made to resolve such problems in the related art, is to provide a monitoring apparatus, a monitoring system and a monitoring method, each of which is configured in such a manner that a user is able to know an activity situation of a person over a predetermined period of time and an activity situation of the person at a certain moment at the same time, using one monitoring screen.

According to a first invention, there is provided a monitoring apparatus which generates and outputs a monitoring moving image that results from superimposing a foreground image showing an activity situation of a moving object in a monitoring area onto a background image, the monitoring apparatus being configured to include: a position information acquirer that detects the moving object from a moving image of the monitoring area and acquires position information on every moving object; a statistical information acquirer that performs temporal statistical processing on the position information acquired by the position information acquirer and acquires statistical information relating to a staying situation of the moving object in accordance with setting of a target period of time for the statistical processing; a first foreground image generator that generates a first foreground image that visualizes the statistical information acquired by the statistical information acquirer; a second foreground image generator that generates a second foreground image corresponding to an image area of the moving object at every predetermined point in time based on the position information acquired by the position information acquirer; and a moving image output controller that generates and outputs the monitoring moving image that results from superimposing the first and second foreground images generated by the first and second foreground image generators onto the background image, at every predetermined point in time.

Accordingly, because the first foreground image shows the activity situation of the moving object over a predetermined period of time, the second foreground image shows the activity situation of the moving object at a certain moment, and the first and second foreground images are displayed on the monitoring screen at the same time, with one monitoring screen, a user can know the activity situation of the moving object over the predetermined period of time and the activity situation of the moving object at the certain moment at the same time.

Furthermore, according to a second invention, the monitoring apparatus may be set to further include a display form regulator that relates to a display form of at least one of the first and second foreground images, in which the display form regulator may be set to be configured to detect a merged stage where the first and second foreground images are confused with each other and to change the display form of at least one of the first and second foreground images in such a manner that the confused state is removed.

Accordingly, because the difficulty in distinguishing the first and second images due to the confused state where the first and second foreground images are confused with each other can be avoided, the user can reliably know an activity situation of the moving object over a predetermined period of time and an activity situation of the moving object at a certain moment. Because the trouble of the user selecting a suitable display form that does not cause the confused state can be avoided, the user's convenience can be increased.

Furthermore, according to a third invention, in the monitoring apparatus, in changing the display form of at least one of the first and second foreground images, the display form regulator may be set to be configured to change at least one among display elements that are a color, a pattern, a contour, and transmissivity that determine the display form.

Accordingly, the display form of at least one of the first and second foreground images is suitably changed, and thus the confused state where the first and second foreground images are confused with each other can be reliably avoided.

Furthermore, according to a fourth invention, the monitoring apparatus may further include a display form setter that relates to the display form of at least one of the first and second foreground images, in which the display form setter may be set to be configured to set the display form of at least one of the first and second foreground images according to a user's input operation.

Accordingly, because the user selects the display form in such a manner that the confused state where the first and second foreground images are confused with each other does not occur, and thus the difficulty in distinguishing the first and second foreground images due to the confused state can be avoided, the user can reliably know the activity situation of the moving object over a predetermined period of time and the activity situation of the moving object at a certain moment.

Furthermore, according to a fifth invention, in the monitoring apparatus, the display form setter may be set to be configured to guide the user's input operation relating to the display form in such a manner that the confused state where the first and second foreground images are confused with each other does not occur.

Accordingly, because the trouble of the user selecting the suitable display form that does not cause the confused state can be avoided, the user's convenience can be increased.

Furthermore, according to a sixth invention, in the monitoring apparatus, when the display form of at least one of the first and second foreground images is set, the display form setter may be set to be configured to limit the candidates for the display form that are selectable with the user's input operation in such a manner that the confused state does not occur.

Accordingly, the erroneous selection of the display form that causes the confused state to occur can be avoided.

Furthermore, according to a seventh invention, in the monitoring apparatus, in setting the display form of at least one of the first and second foreground images, the display form setter may be set to be configured to set at least one among the display elements that are the color, the pattern, the contour, and the transmissivity that determine the display form according to the user's input operation.

Accordingly, the display form of at least one of the first and second foreground images is suitably set, and thus the confused state where the first and second foreground images are confused can be reliably avoided.

Furthermore, according to an eighth invention, the monitoring apparatus may further include a background image generator that generates the background image from the moving image of the monitoring area, in which the background image generator may be set to be configured to generate the background image in accordance with the setting of the target period of time, and the moving image output controller may be set to be configured to superimpose the first foreground image onto the background image that is consistent with the first foreground image in terms of the target period of time.

Accordingly, because the first foreground image and the background image are generated from a moving image, a target period of time for which is the same as those of the first foreground image and the background image, the first foreground image and the background image are aligned with each other, and the user can be prevented from feeling an uncomfortable feeling due to non-alignment of the first foreground image and the background image.

Furthermore, according to a ninth invention, the monitoring apparatus may further include a process condition setter that relates to a process that is performed in the statistical information acquirer, in which the process condition setter may be set to be configured to set the target period of time in accordance to the user's input operation that arbitrarily designates the target period of time, and the moving image output controller is set to be configured to generate and output the monitoring moving image at a designated point in time according to the user's input operation that arbitrarily designates the display point in time of the monitoring moving image.

Accordingly, because the user can freely designate the target period of time, with the first foreground image, the user can know the activity situation of the moving object over various periods of time. Furthermore, because the user can freely designate the display point of time of the monitoring moving image, with the second foreground image, the user can know the activity situation of the moving object at a necessary point of time.

Furthermore, according to a tenth invention, there is provided a monitoring system which generates and outputs a monitoring moving image that results from superimposing a foreground image showing an activity situation of a moving object in a monitoring area onto a background image, the monitoring system being configured to include: a camera that captures a moving image of a monitoring area; and multiple information processing apparatuses in which any one of the multiple information processing apparatuses includes a position information acquirer that detects the moving object from the moving image of the monitoring area and acquires position information on every moving object; a statistical information acquirer that performs temporal statistical processing on the position information acquired by the position information acquirer and acquires statistical information relating to a staying situation of the moving object in accordance with setting of a target period of time for the statistical processing; a first foreground image generator that generates a first foreground image that visualizes the statistical information acquired by the statistical information acquirer; a second foreground image generator that generates a second foreground image corresponding to an image area of the moving object at every predetermined point in time based on the position information acquired by the positional-information acquirer; and a moving image output controller that generates and outputs the monitoring moving image that results from superimposing the first and second foreground images generated by the first and second foreground image generators onto the background image, at every predetermined point in time.

Accordingly, as is the case with the first invention, with one monitoring screen, the user can know the activity situation of the moving object over a predetermined period of time and the activity situation of the moving object at a certain moment at the same time.

Furthermore, according to an eleventh invention, there is provided a monitoring system which generates and outputs a monitoring moving image that results from superimposing a foreground image showing an activity situation of a moving object in a monitoring area onto a background image, the monitoring system being configured to include: a camera that captures a moving image of a monitoring area, and an information processing apparatus, in which any one of the camera and the information processing apparatus includes a position information acquirer that detects the moving object from the moving image of the monitoring area and acquires position information on every moving object; a statistical information acquirer that performs temporal statistical processing on the position information acquired by the position information acquirer and acquires statistical information relating to a staying situation of the moving object in accordance with setting of a target period of time for the statistical processing; a first foreground image generator that generates a first foreground image that visualizes the statistical information acquired by the statistical information acquirer; a second foreground image generator that generates a second foreground image corresponding to an image area of the moving object at every predetermined point in time based on the position information acquired by the positional-information acquirer; and a moving image output controller that generates and outputs the monitoring moving image that results from superimposing the first and second foreground images generated by the first and second foreground image generators onto the background image, at every predetermined point in time.

Accordingly, as is the case with the first invention, with one monitoring screen, the user can know the activity situation of the moving body over a predetermined period of time and the activity situation of the moving object at a certain moment at the same time.

Furthermore, according to a twelfth invention, there is provided a monitoring method of causing an information processing apparatus to perform processing that generates and outputs a monitoring moving image that results from superimposing a foreground image showing an activity situation of a moving object in a monitoring area onto a background image, the monitoring method be configured to include: detecting the moving object from a moving image of the monitoring area and acquiring position information on every moving object; performing temporal statistical processing on the position information and acquiring statistical information relating to a staying situation of the moving object in accordance with setting of a target period of time for the statistical processing; generating a first foreground image that visualizes the statistical information; generating a second foreground image corresponding to an image area of the moving object at every predetermined point in time based on the position information; and generating and outputting the monitoring moving image that results from superimposing the first and second foreground images onto the background image, at every predetermined point in time.

Accordingly, as is the case with the first invention, with one monitoring screen, the user can know the activity situation of the moving body over a predetermined period of time and the activity situation of the moving object at a certain moment at the same time.

Embodiments of the present invention will be described below referring to the drawings.

First Embodiment

FIG. 1 is a diagram illustrating an entire configuration of a monitoring system according to the first embodiment. The monitoring system is established for a retail chain store such as a convenience store, and includes camera 1, recorder (a moving image storage) 2, and PC (a monitoring apparatus) 3.

Camera 1 is installed at a suitable place within a store (a facility). A moving image of the inside of the store is captured by camera 1, and the moving image obtained by this is stored in recorder 2.

Input device 6 on which a user such as a store manager performs various input operations, such as a mouse, and monitor (a display device) 7 on which a monitoring screen is displayed are connected to PC 3. PC 3 is installed at a suitable place within the store. With the monitoring screen displayed on monitor 7, the user can browse through moving images of the inside of the store, which are captured by camera 1, in real time and can browse through past moving images of the inside of the store, which were recorded in recorder 2.

Furthermore, camera 1, recorder 2, and PC 3 are installed in each of the multiple stores, and PC 11 is installed in a head office that generally manages the multiple stores. In PC 11, the moving images of the inside of the store that are captured with camera 1 can be browsed through in real time, the past moving images of the inside of the store that were recorded in recorder 2 can be browsed through, and thus, a situation of the inside of the store can be checked in the head office.

According to the present embodiment, PC 3 installed in the store is configured as a monitoring apparatus that monitors a person and states of commodities within the store. The monitoring information generated in PC 3 can be browsed through in PC 3 by the user on the store side, for example, the store manager, is transmitted to PC 11 installed in the head office, and thus can also be browsed through in PC 11 by a user on the head office side, for example, a district manager (the supervisor and the like) who provides a guidance and a proposal to each of the stores within a district of which the district manager is in charge. Furthermore, PCs 3 and 11 are configured as browsing apparatuses in which the monitoring information is browsed through.

Figure 2:
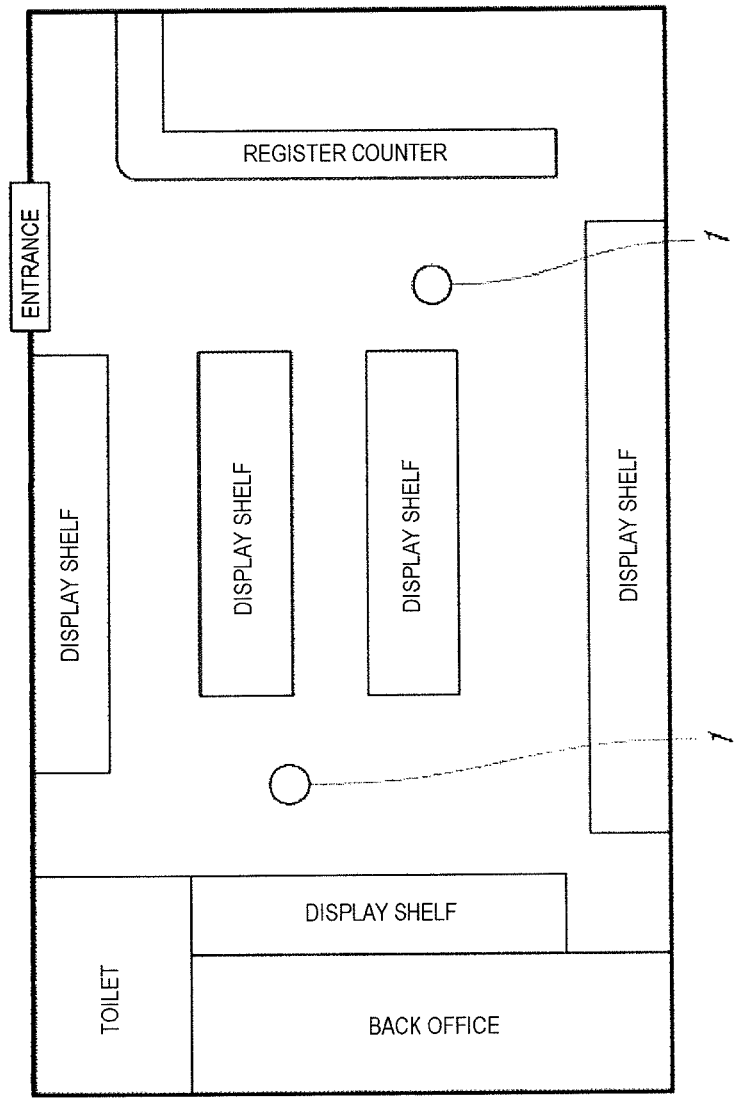
FIG. 2 is a top-view diagram of a store for describing a store layout and an installation status of a camera.

Next, a store layout and an installed state of camera 1 are described. FIG. 2 is a top-view diagram for describing the store layout and the installed situation of camera 1.

In the store, an entrance door, display shelves, a check-out counter, and the like are installed. The display shelves are installed in a state of being categorized according to types of commodities such as a box lunch, a PET bottle, and a rice ball. A customer enters the store through the entrance door, and moves along a passage between the display shelves within the store. When the customer finds a commodity that he/she wants to purchase, he/she picks it up and moves to a register counter. After making payment on account (paying for the commodity) at the register counter, the customer leaves the store through the entrance door.

Furthermore, in the store, multiple cameras 1 that capture images of the inside (the monitoring area) of the store are installed. The camera is installed in a suitable position on the ceiling of the store. Particularly, in an example that is illustrated in FIG. 2, as camera 1, an omnidirectional camera with a fish-eye lens that has a photographing range of 360 degrees is adopted, and with this camera 1, images of persons that enter and leave the store through the entrance door, of persons that are present within the store, and of commodities on the display shelves can be captured.

Next, an outline of processing that is performed in PC 3 that is illustrated in FIG. 1 is described. FIGS. 3A, 3B, 4A, 4B, 5A, and 5B are explanatory diagrams for describing the outline of the processing that is performed in PC 3.

As illustrated in FIG. 3A, persons who stop in front of the display shelves and determines the merits of each commodity, persons who shop around to find the commodities that they want to buy, or the like are shown in a moving image that is captured by camera 1. At this point, the persons who stop in front of the display shelves to determine the merits of the commodities does not move in front of the display shelves during a predetermined period of time or longer, and thus are in a state where they stay in front of the display shelves. The staying situation of the person in front of the display shelf indicates the extent to which the customer is interested in the commodity on the display shelf, and can be used for customer behavior analysis.

At this point, according to the present embodiment, in order to know the extent to which the customer is interested in a salesroom that the user such as the store manager pays attention to, specifically in the display shelf for commodities that the user pays attention to, a target area is set to be on an area where a passage and the like in front of the display shelf for commodities that the user pays attention to is shown, and statistical information relating to a staying situation of a person within the target area, specifically, the number of stays (the number of staying persons), that is, the number of persons staying within the target area, and staying time, that is, time for which the person within the target area stays are acquired. A heat map image that results from visualizing the statistical information is generated and the heat map image, as illustrated in FIG. 3B, is displayed in a state of being superimposed onto the background from which the person is removed. With the heat map image, the extent to which the customer is interested in the salesroom corresponding to the target area (the display shelf for commodities) can be known.

As an example that is illustrated in FIG. 3A, 3 target areas A1 to A3 are set to be in a moving image, and as illustrated in FIG. 3B, heat map images H1 to H3 are displayed on positions corresponding to target areas A1 to A3.

In the heat map image, a numerical value of statistical information is expressed by changing the display form (characteristics of the image), specifically, by at least one among the display elements that are the size and the color (a hue, intensity, or the like). Particularly, in an example that is illustrated in FIG. 3B, the heat map image takes the shape of an ellipse. The staying time is expressed with the intensity of filling color of the ellipse and the number of stays (the number of staying persons) is expressed with a size of the heat map image. The longer the staying time, the more intense the color of the heat map image is. The more the number of stays increases, the greater the heat map image is in size.

Furthermore, in a case where a moving image that is captured by camera 1 is browsed through for the purpose of the monitoring for protection against crime or disaster, no problem occurs, but in a case where the image captured by camera 1 is used for purposes other than the monitoring, such as the customer behavior analysis describe above, there is a need to protect the privacy of the customer.

Figure 4A:
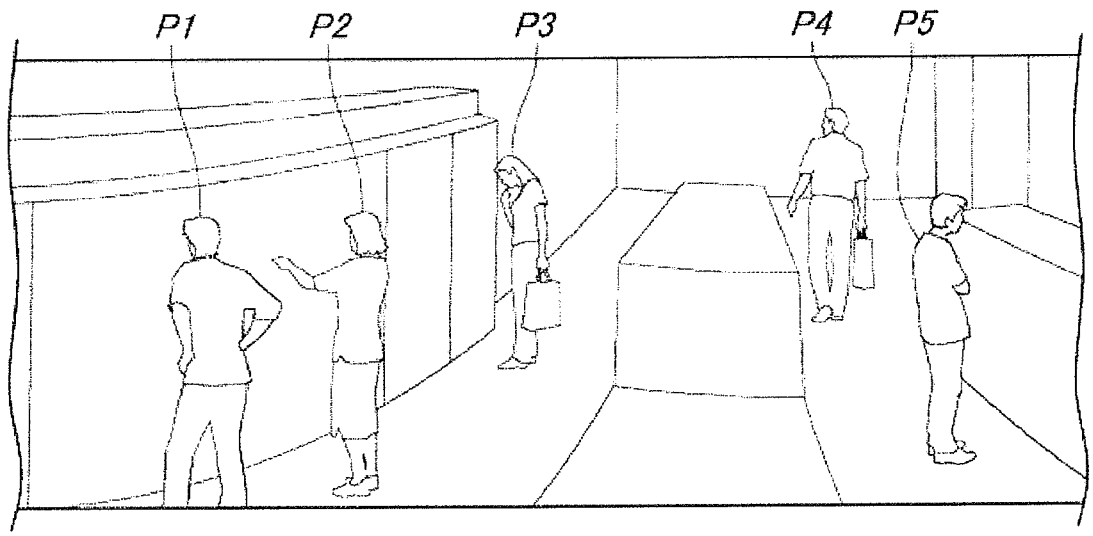
FIG. 4A is an explanatory diagram for describing an outline of the processing that is performed in the PC.
Figure 4B:
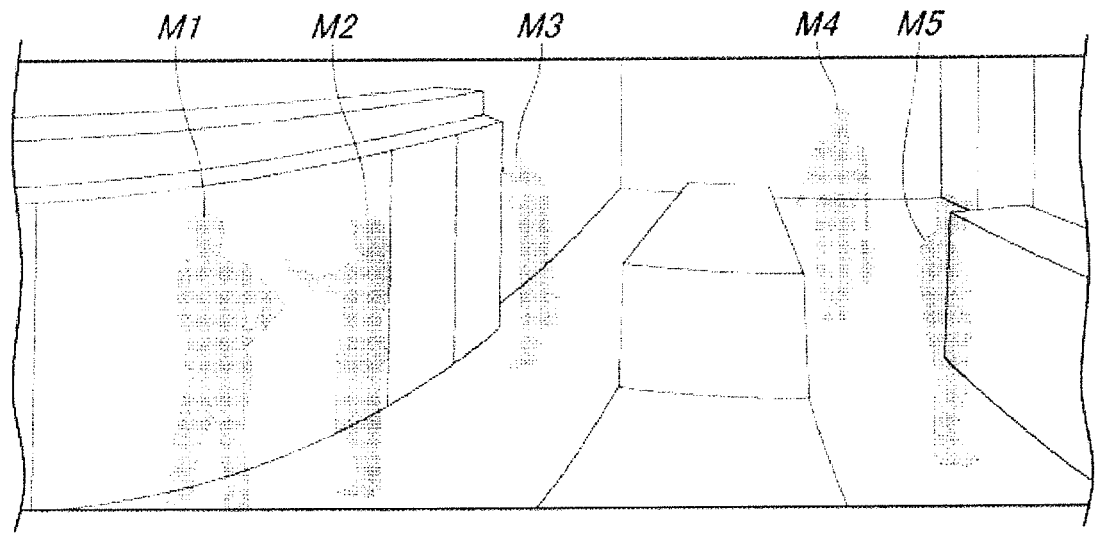
FIG. 4B is an explanatory diagram for describing an outline of the processing that is performed in the PC.

Accordingly, according to the present embodiment, as illustrated in FIGS. 4A and 4B, based on the position information on every person, which is acquired by person detection, a mask image corresponding to a person moving image area is generated and the mask image is displayed on the background image in a superimposed state. In an example that is illustrated in FIG. 4A, 5 persons P1 to P5 are shown in a moving image, and as illustrated in FIG. 4B, image areas of persons P1 to P5 are changed to mask images M1 to M5, respectively.

Figure 5A:
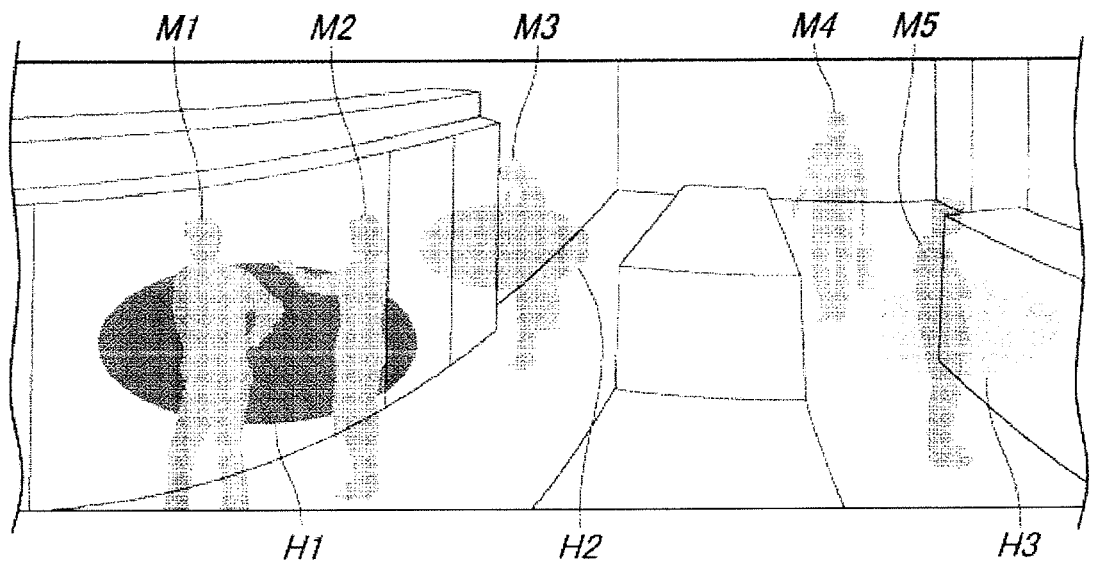
FIG. 5A is an explanatory diagram for describing an outline of the processing that is performed in the PC.

In this manner, according to the present embodiment, the heat map image and the mask image are displayed on the background image in a superimposed state, but particularly, according to the present embodiment, as illustrated in FIG. 5A, the heat map image and the mask image can be displayed at the same time.

In this case, a state where each image area of the heat map image and the mask image are superimposed frequently occurs, but when, in this state, display forms of the mask image and the heat map image are consistent with or similar to each other, a confused state where the heat map image and the mask image are confused with each other occurs. That is, a border between the image areas of the heat map image and the mask image is unclear, and it is difficult to distinguish between the heat map image and the mask image. In an example that is illustrated in FIG. 5A, the confused state occurs in mask image M3 and heat map image H2.

Figure 5B:
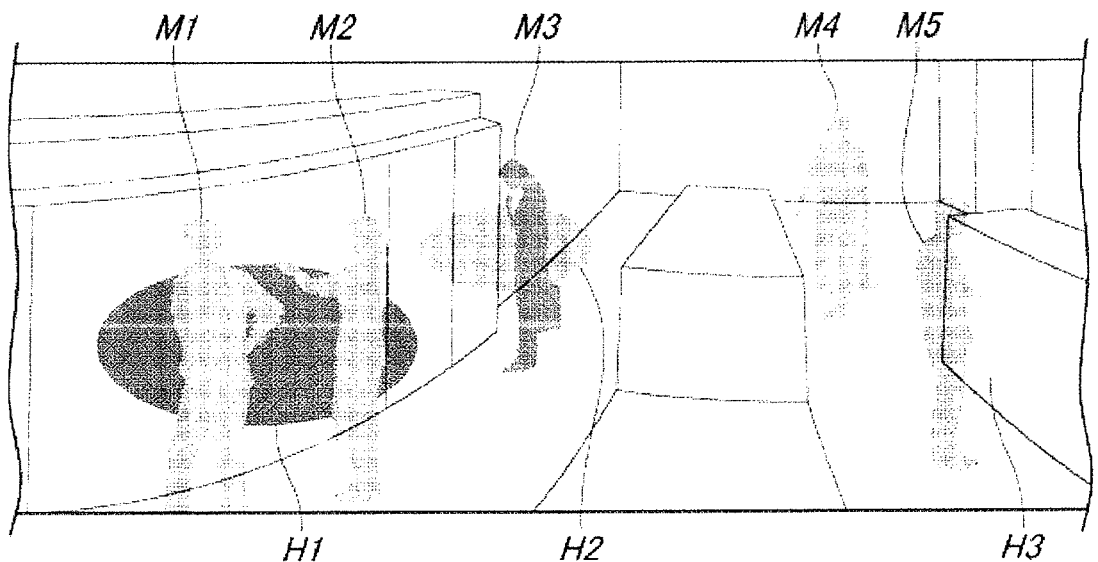
FIG. 5B is an explanatory diagram for describing an outline of the processing that is performed in the PC.

Accordingly, according to the present embodiment, in a case where the confused state where the heat map image and the mask image are confused with each other, as confusion avoidance process that avoids such a confused state, as illustrated in FIG. 5B, the display form of the mask image is set to be changed to a display form in which the mask image is neither consistent with, nor similar to the heat map image. In an example that is illustrated in FIG. 5B, a color of mask image M3 in which the confused state occur is changed to be different from a color of heat map image H2. This confusion avoidance processing is hereinafter also referred to as a "dynamic display change mode."

Furthermore, according to the present embodiment, when the display form of the mask image is selected by the user, the confused state does not occur, that is, the candidates for the display form that are selectable by the user are limited in such a manner that the display forms of the heat map image and the mask image are neither consistent with, nor similar to each other. This confusion avoidance processing is hereinafter referred to as a "static display change mode."

According to the present embodiment, because the heat map image and the mask image are set to be transmissive, a state where the background image is transmissive and seen is attained.

Figure 6:
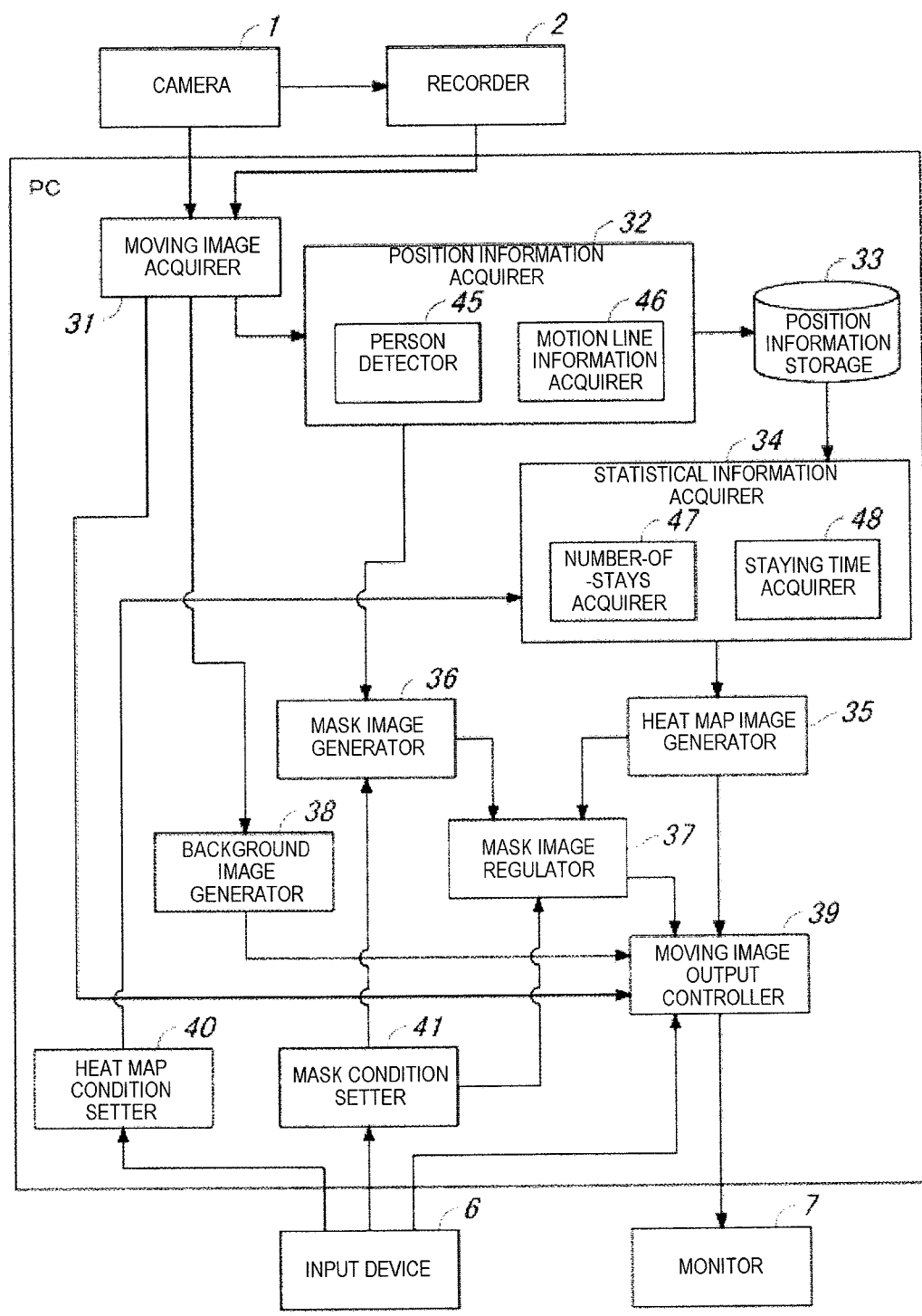
FIG. 6 is a functional block diagram illustrating a schematic configuration of the PC.

Next, processing that is performed in PC 3 that is illustrated in FIG. 1 is described. FIG. 6 is a functional block diagram illustrating a schematic configuration of PC 3.

PC 3 includes moving image acquirer 31, position information acquirer 32, position information storage 33, statistical information acquirer 34, heat map image generator (the first foreground image generator) 35, mask image generator (the second foreground image generator) 36, mask image regulator (the display form regulator) 37, background image generator 38, moving image output controller 39, heat map condition setter (the process condition setter) 40, and mask condition setter (the display form setter) 41.

In moving image acquirer 31, a moving image of the inside of the store that is captured by camera 1 is acquired from camera 1 or recorder 2. At this point, in a case where a current moving image is displayed in real time, a moving image is acquired from camera 1, and in a case where a past moving image is displayed, an image is acquired from recorder 2.

Position information acquirer 32 detects a person from the moving image that is acquired in moving image acquirer 31 and acquires the position information on every person, and includes person detector 45 and motion line information acquirer 46.

In person detector 45, processing that detects a person from a moving image (a frame) acquired in moving image acquirer 31 is performed. The processing that is performed in person detector 45 may use a known image recognition technology. In motion line information acquirer 46, based on a result of the detection in person detector 45, processing that acquires information relating to a motion line of a person or the like is performed. The pieces of information relating to the motion line of the person or the like, which are acquired in motion line information acquirer 46, are stored in position information storage 33 as the position information.

In position information acquirer 32, coordinates of a person's central point are acquired and the motion line that connects the central points is generated, but in addition to this, coordinate information relating to the person moving image area is acquired for mask image generation. Furthermore, time information relating to a point in time at which every person is detected, and the like, which are acquired starting from a point in time at which a moving image from which a person is detected is captured is included in the position information that is acquired in position information acquirer 32.

Statistical information acquirer 34 performs the temporal statistical processing on pieces of position information (motion line information) of a person that are acquired by position information acquirer 32 and are stored in the position information storage 33, and acquires the statistical information (the staying time and the number of stays) relating to the staying situation of a person with each target area (refer to FIGS. 3A and 3B) being a target in accordance with the setting of the target period of time for the statistical processing. Statistical information acquirer 34 includes number-of-stays acquirer 47 and staying time acquirer 48.

In number-of-stays acquirer 47, based on the pieces of motion line information on every person, which are stored in the position information storage 33, processing that acquires the number of stays (the number of staying persons) in every target area for the target period of time is performed. In this processing, the number of motion lines that pass through each target area during the target period of time is counted and the number of stays in every target area during the target period of time is obtained.

In staying time acquirer 48, based on the pieces of motion line information on every person, which are stored in the position information storage 33, processing that acquires the staying time in every target area during the target period of time is performed. In this processing, first, the staying time in the target area is acquired from the staying time of every person during the target period of time (a point in time at which the person enters the target area and a point in time at which the person leaves the target area), and next, the staying time in every target area is acquired, with suitable statistical processing such as averaging, from the staying time for which every person stays.

In heat map image generator 35, processing is performed that generates the heat map image (the first foreground image) which results from visualizing the statistical information (the number of stays and the staying time) that is acquired in statistical information acquirer 34. According to the present embodiment, the display form of the heat map image (the color, the transmittance, or the like) is set to be set in advance, but may be set to be suitably selected by the user.

In heat map condition setter 40, according to the user's input operation, processing is performed that sets various conditions that are to be met when generating the heat map image. According to the present embodiment, processing conditions relating to the statistical processing that is performed in statistical information acquirer 34, specifically, the target area and the target period of time are set according to the user's input operation. In accordance with the processing conditions (the target area and the target period of time) that are set in heat map condition setter 40, the statistical processing is performed in statistical information acquirer 34.

A period-of-time-fixed type in which the target period of time is fixed, and a period-of-time-variable type in which the target period of time is not fixed are available for setting the target period of time for the statistical processing. In a case of the period-of-time-fixed type, for example, a time span such as 9:00 to 12:00 can be designated, and the heat map image in the time span is generated. In a case of the period-of-time-variable type, for example, predetermined time such as 30 minutes or one hour, can be designated, and the same operation as the period-of-time-fixed type is performed until an initial predetermined time is reached. However, thereafter, a starting point in time and an ending point in time between which a heat map image is generated are updated, and a heat map image in an updated time span (predetermined time) is generated.

At this point, in setting the target area, if an input screen on which the moving image of the inside of the store is displayed is displayed on monitor 7, a position of the target area is input by the user through the input screen, and thus the position information on the target area is acquired, this may be sufficient. Furthermore, in setting the target period of time for the statistical processing, if the input screen for the target period of time is displayed on monitor 7, according to a type (the period-of-time-variable type, or the period-of-time-fixed type) of target period of time for the statistical processing, a length or a range of the target period of time is input by the user into the input screen, and thus information relating to the target period of time is acquired, this may be sufficient.

In mask image generator 36, based on the position information on the person moving image area, which is acquired in position information acquirer 32, processing is performed that generates the masks image (the second foreground image) corresponding to the person moving image area at every predetermined point in time. The mask image may be generated not only in such a manner that the mask image corresponds to all portions of the person moving image area, but also in such a manner that the mask image corresponds to one portion of the person moving image area. That is, from the point of view of privacy protection, only an image area that needs to be concealed, for example, a face image area, may be covered with the mask image.

In mask image regulator 37, processing that changes the display form of the mask image is performed in such a manner that the confused state where the heat map image and the mask image are confused with each other is detected and the confused state is removed, that is, in such a manner that the display form of the mask image is neither consistent with, nor similar to the display form of the heat map image. This processing is performed in such a case where the dynamic display change mode is selected. In a case where the confused state does not occur, the mask image that is generated in mask image generator 36 is output as is, without the display form being changed.

At this point, in order to monitor the confused state, first, the position information on each image area of the mask image and the heat map image is acquired, and it is determined whether or not the image areas of the mask image and the heat map image overlap each other. Furthermore, by acquiring the display form of the heat map image and comparing the acquired display form with the display form of the mask image that is set by the user, it is determined whether or not the display forms of the heat map image and the mask image are consistent with, or similar to each other. In a case where the image areas of the mask image and the heat map image overlap each other and the display forms of the heat map image and the mask image are consistent with, or similar to each other, it is determined that this is the confused state.

Furthermore, the display form of the heat map image varies according to values of the pieces of statistical information (the staying time and the number of stays), but the pieces of statistical information that are sources of the heat map images are generated in accordance with the setting of the target period of time for the statistical processing, and are sequentially changed. For this reason, in the dynamic display change mode, whenever the statistical information changes, detection processing of the confused state starts over.

In mask condition setter 41, according to the user's input operation, processing is performed that sets various conditions relating to the mask image. According to the present embodiment, the display form of the mask image and a display change style are set based on conditions for processing that is performed in each of mask image generator 36 and mask image regulator 37, specifically, depending on dynamic display change mode and the static display change mode. In accordance with the conditions that are set in mask condition setter 41, predetermined processing is performed in each of mask image generator 36 and mask image regulator 37.

At this point, in setting conditions relating to the mask image, a mask condition setting screen (refer to FIGS. 9A and 9B) is displayed and the conditions relating to the mask images is caused to be selected by the user through the mast condition setting screen, and thus information on the conditions relating to the mask image is acquired.

In background image generator 38, processing is performed that generates the background image from the moving image acquired in moving image acquirer 31. The background image results from removing a person image (the foreground image) from the captured moving image. If the background image is made to be generated from multiple moving images (frames) during the most recent predetermined learning period of time, this may be sufficient. If a known technology is used for processing that is performed in background image generator 38, this may be sufficient. A moving image that is captured when a person is not present, for example, a moving image that is captured before the store is opened may be prepared in advance as a background image.

In moving image output controller 39, processing is performed that superimposes the heat map image generated in heat map image generator 35, and the mask image in mask image generator 36 or the mask image of which the display form is changed in mask image regulator 37 onto the background image generated in background image generator 38, and generates the monitoring moving image at every predetermined point in time. Accordingly, the monitoring screen (refer to FIGS. 7, 10A, 10B, 11A, and 11B) is displayed on monitor 7. Furthermore, in moving image output controller 39, processing is performed that displays the mask condition setting screen (refer to FIGS. 9A and 9B) on monitor 7.

Furthermore, in moving image output controller 39, processing is performed that controls an output of the monitoring moving image according to the user's input operation. Particularly, in moving image output controller 39, processing is performed that, according to the user's input operation that arbitrarily designates a display point in time of the monitoring moving image, generates and outputs the monitoring moving image at the designated display point in time.

Either of or both of the heat map image and the mask image can be displayed according to the user's selection. Furthermore, in a case where the moving images of the inside of the store are browsed through for the purpose of the monitoring for the protection against crime or disaster, there is no need for the heat map image and the mask image, and in this case, an original moving image acquired in moving image acquirer 31 is output as is.

As illustrated in FIG. 6, PC 3 has a processor (a CPU) and a program memory. Each unit of PC 3 is realized by executing an application program (an instruction) for monitoring (browsing-through of moving images) in the CPU in PC 3. This program may not only be configured as a dedicated device that is introduced in advance in PC 3 as the information processing apparatus, but may also be set to be provided to the user in a state of being recorded on a suitable program recording medium, as an application program running on a general-purpose OS, or through a network.

Figure 7:
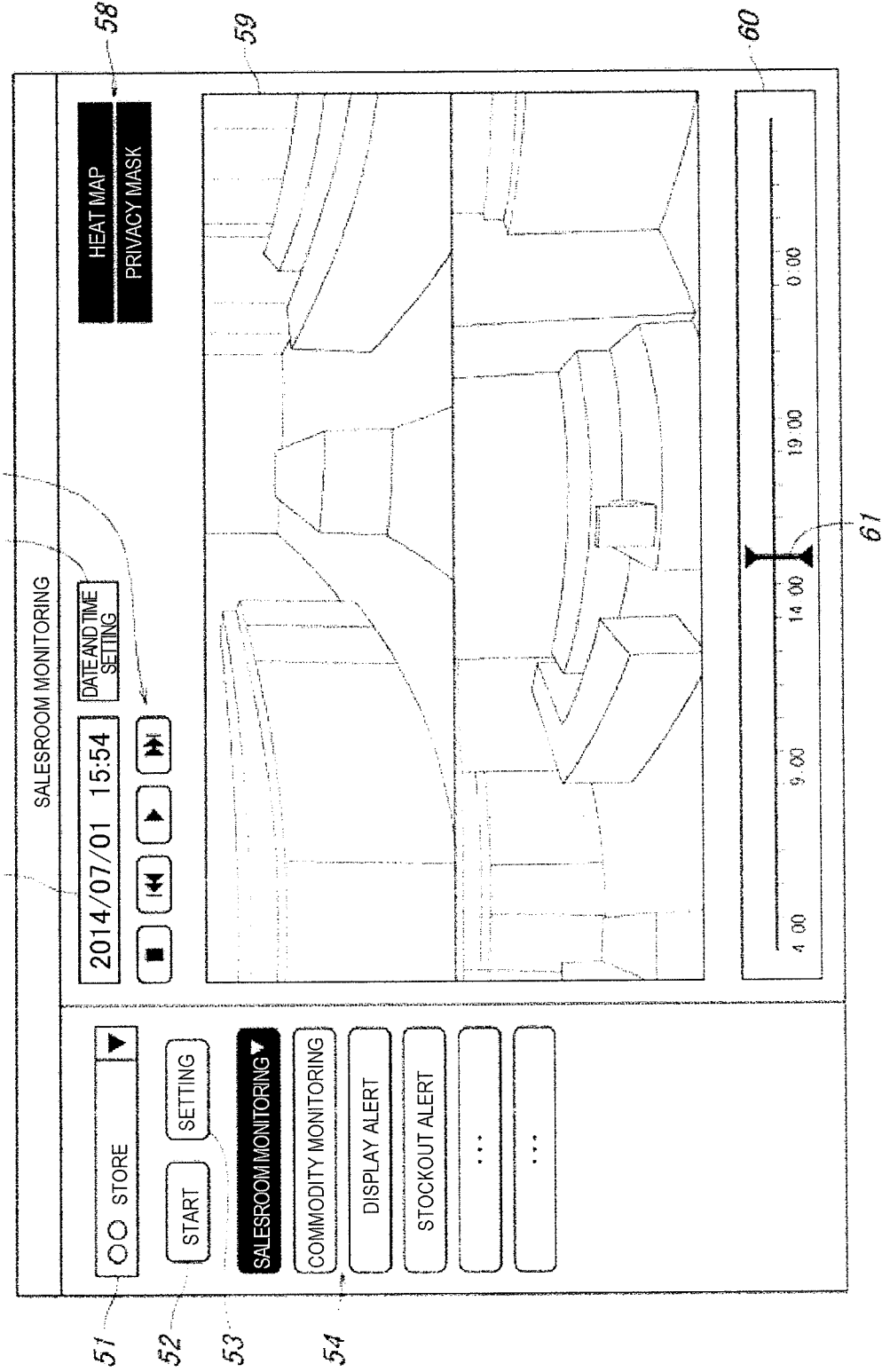
FIG. 7 is an explanatory diagram illustrating a monitoring screen that is displayed on a monitor.
Figure 8:
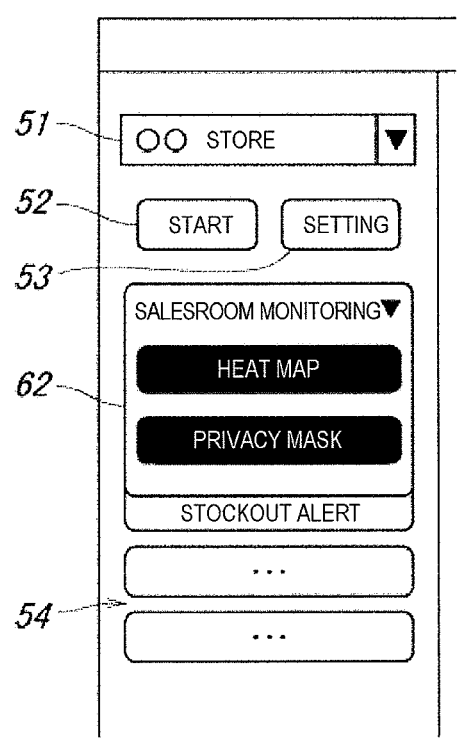
FIG. 8 is an explanatory diagram illustrating a main part of the monitoring screen that is illustrated in FIG. 7.

Next, the monitoring screen that is displayed on monitor 7 that is illustrated in FIG. 6 is described. FIG. 7 is an explanatory diagram illustrating the monitoring screen that is displayed on monitor 7. FIG. 8 is an explanatory diagram illustrating a main part of the monitoring screen illustrated in FIG. 7.

The user browses through this monitoring screen in order to know the activity situations of the customers within the store. Included in the monitoring screen are store selection section 51, starting button 52, setting button 53, operation mode selection section 54, date and time display section 55, date and time setting button 56, moving image operation section 57, display mode display section 58, moving image display section 59, and display point-in-time operation section 60.

In store selection section 51, a store is selected, with a pull-down menu, by the user. With starting button 52, monitoring processing is performed in PC 3. With setting button 53, various conditions in the monitoring processing are set. According to the present embodiment, when setting button 53 is operated, the mask condition setting screen (refer to FIGS. 9A and 9B) is displayed in a pop-up manner. In operation mode selection section 54, an operation mode is selected. Operation modes, such as salesroom monitoring, commodity monitoring, display alert, and stockout alert, are prepared. The monitoring screen is displayed by selecting the salesroom monitoring.

A date and time is displayed on date and time display section 55. With date and time setting button 56, the data and time is set. When date and time setting button 56 is operated, date and time setting screen that is not illustrated is displayed, and, by selecting a date and time, the selected date and time is displayed on date and time display section 55 and a moving image at the selected date and time is displayed on moving image display section 59.

A monitoring moving image (a moving picture) that is generated in moving image output controller 39 is displayed on moving image display section 59. Particularly, in an example that is illustrated in FIG. 7, two moving images that result from panoramically expanding a moving image which is captured by camera 1 that is an omnidirectional camera are displayed. The entire store is shown in the two moving images, and a situation of the entire store can be checked. The monitoring moving image that is displayed on moving image display section 59 will be described below.

In moving image operation section 57, an operation relating to reproduction of the monitoring moving image that is displayed on moving image display section 59 is performed. Operation buttons for normal reproduction, fast forwarding, rewinding, and stopping are provided in moving image operation section 57. The monitoring moving image can be efficiently browsed through over a long period of time by operating these operation buttons.

In display point-in-time operation section 60, the display point in time of the monitoring moving image that is displayed on moving image display section 59 is adjusted. Switching to a monitoring moving image at a desired date and time can be performed by operating this display point-in-time operation section 60. Specifically, when slider 61 is shifted using input device 6 such as a mouse, the monitoring moving image at a point in time that is indicated by slider 61 is displayed on moving image display section 59.

When a button for the salesroom monitoring, of operation mode selection section 54 is pushed down, as illustrated in FIG. 8, pull-down menu 62 is displayed, and with pull-down menu 62, the user can select display modes for a heat map and a privacy mask, respectively. In a heat map display mode, the monitoring moving image (refer to FIG. 3B) that results from superimposing the heat map image onto the background image is displayed on moving image display section 59. In a privacy mask display mode, the monitoring moving image (refer to FIG. 4B) that results from superimposing the mask image onto the background image is displayed on moving image display section 59. Furthermore, both of the display modes for the heat map and the privacy mask can be selected, and in this case, the monitoring moving image (refer to FIGS. 5A and 5B) that results from superimposing the heat map image and the mask image onto the background image at the same time is displayed on moving image display section 59.

As illustrated in FIG. 7, a selected state of the display mode of each of the heat map and the privacy mask is displayed on display mode display section 58. In an example that is illustrated in FIG. 7, both of the display modes of the heat map and the privacy mask are selected, and the selected state is displayed in an inverted-display manner.

Figure 9A:
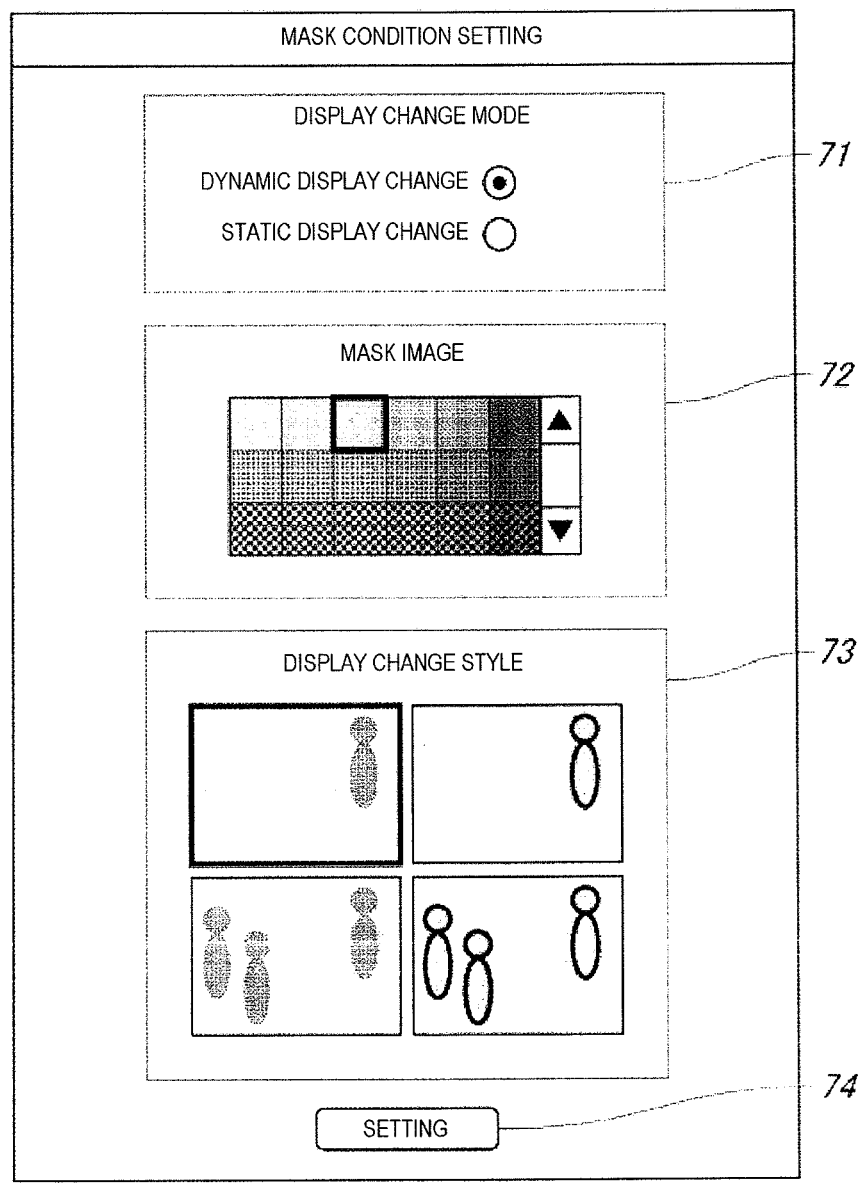
FIG. 9A is an explanatory diagram illustrating a mask condition setting screen that is displayed on the monitor.
Figure 9B:
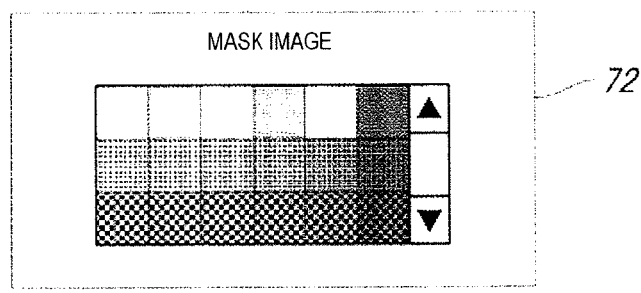
FIG. 9B is an explanatory diagram illustrating the mask condition setting screen that is displayed on the monitor.

Next, processing that is performed in mask condition setter 41 that is illustrated in FIG. 6 is described. FIGS. 9A and 9B are explanatory diagrams illustrating the mask condition setting screen that is displayed on monitor 7.

According to the present embodiment, in mask condition setter 41, according to the user's input operation, processing is performed that sets various conditions relating to the mask image, and at this time, the mask condition setting screen that is illustrated in FIG. 9A is displayed on monitor 7. The user designates various conditions relating to the mask image through the mask condition setting screen, which is displayed in a pop-up manner according to the operation of setting button 53 on the monitoring screen (refer to FIG. 7).

Provided on the mask condition setting screen, are display change mode selection section 71, display form selection section 72, display change style selection section 73, and setting button 74.

In display change mode selection section 71, the user selects either of the dynamic display change mode and the static display change mode. In dynamic display change mode, in a case where the confused state where the heat map image and the mask image are confused with each other occurs, the display form of the mask image is changed. In the static display change mode, the candidates for the display form of the mask image are limited in advance in such a manner that the confused state where the heat map image and the mask image are confused with each other does not occur.

In display form selection section 72, the user selects the display form of the mask image. In an example that is illustrated in FIG. 9A, the candidates for the display form of the mask image are displayed in a tile menu manner.

At this point, when the static display change mode is selected in the display change mode selection section 71, the confused state where the heat map image and the mask image are confused with each other does not occur. That is, the candidates for the display form that are selectable by the user are limited in such a manner that the display forms of the heat map image and the mask image are neither consistent with, nor similar to each other, and in display form selection section 72, as illustrated in FIG. 9B, a candidate for the display form of the heat map that is consistent with or similar to the display form of the heat map image, among the candidates for the display form, is a non-selectable. In an example that is illustrated in FIG. 9B, the non-selectable display form is displayed in a white blank manner.

The display form of the heat map image varies according to a value (the staying time and the number of stays) of the statistical information, the candidates for the display form of the mask image are limited in such a manner that the display form of the mask image is neither consistent with, not similar to all the display forms that are allocated to the heat map image.

In display change style selection section 73, the user selects in which manner the display change style, that is, the display form of the mask image is changed when the display form of the mask image is changed in the dynamic display change mode. In an example that is illustrated in FIG. 9A, candidates for display change style are displayed, in the form of schematic images, on display change style selection module 73. The display change styles that are illustrated in FIG. 9A correspond to columns that are illustrated FIGS. 10A, 10B, 11A, and 11B, respectively, and will be described in detail below.

As described above, when the user performs necessary selection operations in display change mode selection section 71, display form selection section 72, and display change style selection section 73 and thus operates setting button 74, processing that sets conditions relating to the mask image in accordance with contents selected by the user is performed in mask condition setter 41 is performed.

The mask condition setting screen is displayed in a case where, among the display modes for the heat map and the privacy mask, at least the privacy mask display mode is selected, but display change mode selection section 71 and display change style selection section 73 are necessary in a case where both of the display modes of the heat map and the privacy mask are selected. In a case where only the privacy mask display mode is selected, the display change mode selection section 71 and the display change style selection section 73 may be displayed in a grayed-out manner and thus may be made to be in a non-selectable state, or the display change mode selection section 71 and the display change style selection section 73 may be set not to be displayed on the mask condition setting screen.

Furthermore, the display change style selection section 73 may be necessary in a case where the dynamic display change mode is selected in display change mode selection section 71, and display change style selection section 73 may be displayed in a grayed-out manner and thus may be made to be in a non-selectable state in a case where the static display change mode is selected.

Next, the monitoring moving image that is displayed in a case where the dynamic display change mode is selected is described. FIGS. 10A, 10B, 11A, AND 11B are explanatory diagrams illustrating examples of the monitoring moving image that is displayed in the dynamic display change mode.

According to the present embodiment, in the dynamic display change mode, in a case where the confused state where the heat map image and the mask image are confused with each other occurs, processing may be performed that changes the display form of the mask image to a display form that is neither consistent with, or similar to the display form of the heat map image, and any one display element or multiple display elements among various display elements that determine the display form of the mask image may be changed in changing the display form of the mask image.

Furthermore, in changing the display form of the mask image, there are a method of limiting the mask image of which the display form is to be changed to a mask image where the confused state occurs between the mask image and the heat map image and a method of changing the display forms of all the mask images.

Figure 10A:
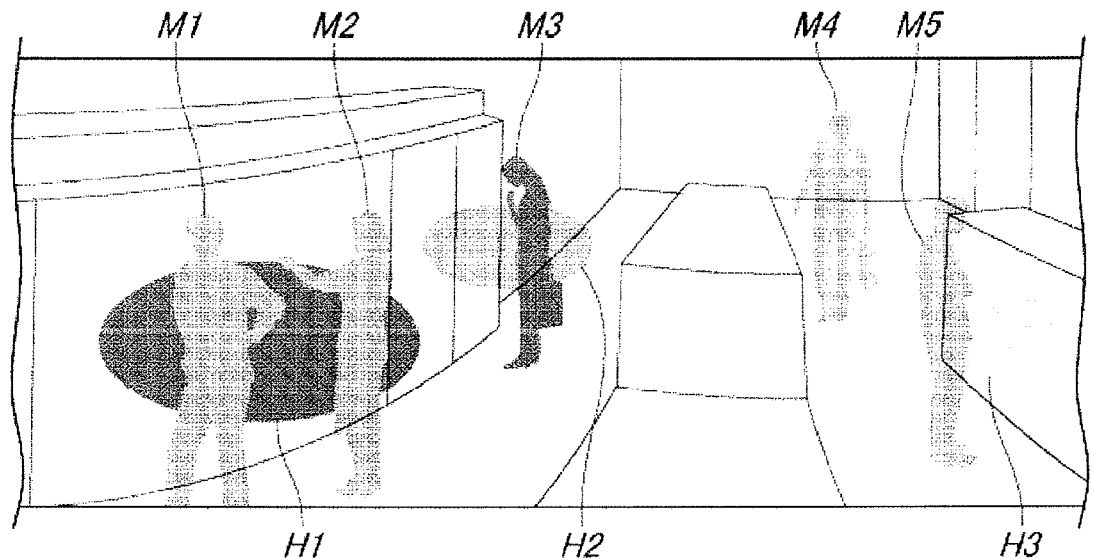
FIG. 10A is an explanatory diagram illustrating an example of a monitoring moving image that is displayed in a dynamic display change mode.
Figure 10B:
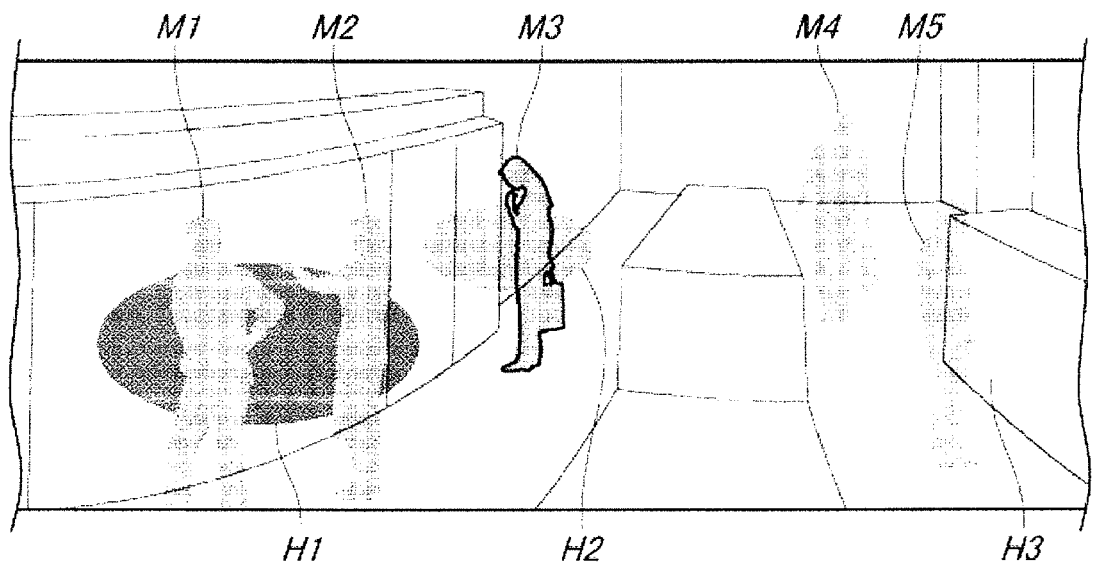
FIG. 10B is an explanatory diagram illustrating an example of the monitoring moving image that is displayed in the dynamic display change mode.

In examples that are illustrated in FIGS. 10A and 10B, as illustrated in FIG. 5A, the display form of only mask image M3 in which the confused state occurs between the mask image and the heat map image H2 may be changed. On the other hand, in examples that are illustrated in FIGS. 11A and 11B, the display forms of all the mask images may be changed.

Figure 11A:
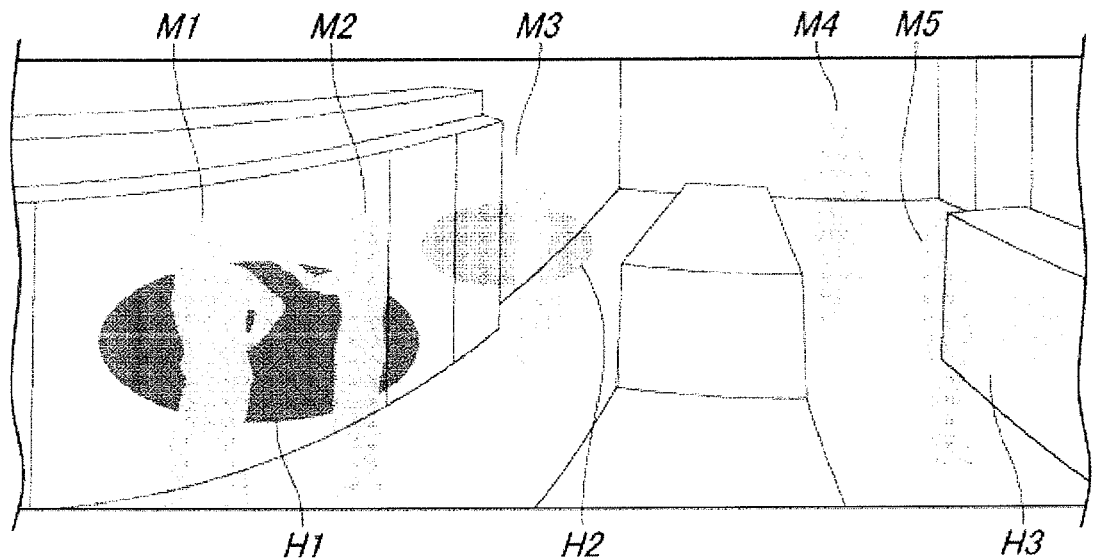
FIG. 11A is an explanatory diagram illustrating an example of the monitoring moving image that is displayed in the dynamic display change mode.
Figure 11B:
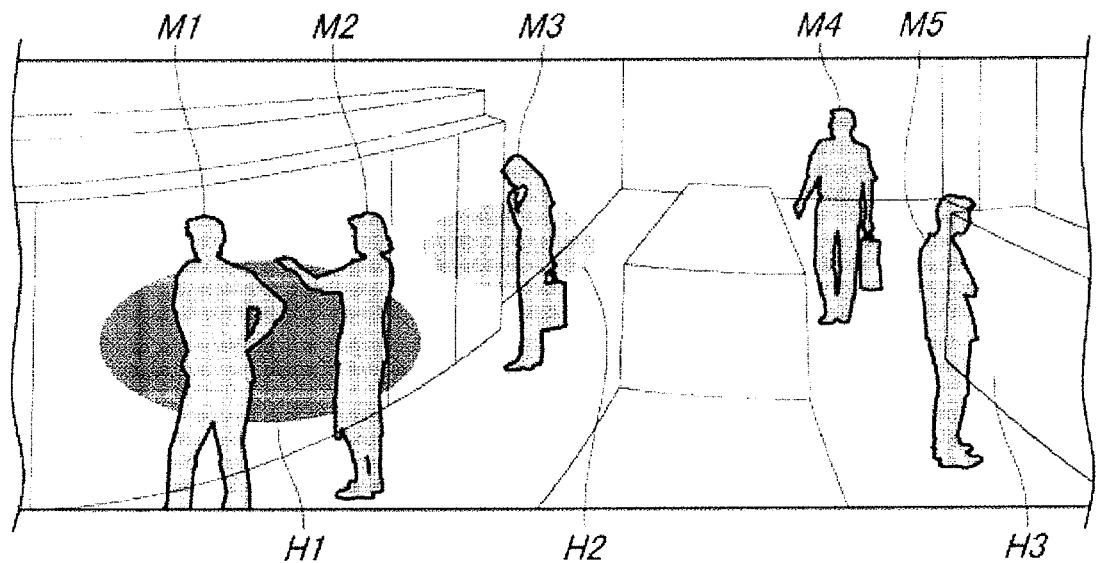
FIG. 11B is an explanatory diagram illustrating an example of the monitoring moving image that is displayed in the dynamic display change mode.

Furthermore, in the examples that are illustrated in FIGS. 10A and 11A, respectively, a color (intensity) that is one of the display elements that determine the display form may be changed. On the other hand, in the examples that are illustrated in FIGS. 10B and 11B, a contour that is one of the display elements may be displayed. That is, the contour is set to be non-displayed in an initial state and may be set to be displayed in a case where the confused state occurs.

As illustrated in FIG. 11A, in a case where the display forms of all the mask images are changed, the display form of the mask image needs to be changed in such a manner that the confused state does not occur not only in the heat map image in which the confused state occurs from the start, but also between the mask images and each of the other heat map images.

Furthermore, according to the present embodiment, the example where each of the elements that are the color and the contour is described, but the elements to be changed are not limited to the color and the contour. A pattern (a design) or transmissivity may be set to be changed.

Next, processing that is performed on each of the units of PC 3 that are illustrated in FIG. 6 is described. FIG. 12 is an explanatory diagram for describing an outline of the processing that is performed in each of the units of PC 3. FIG. 12 illustrates a situation where the monitoring moving image is output in a case where the target period of time for the processing conditions that are set in heat map condition setter 40 is the period-of-time-variable type, and for example, is designated as a time of 30 minutes. At this point, a processing state at a timing at which a moving image (a frame) that is last captured during the target period of time is output is illustrated.

According to the present embodiment, in position information acquirer 32, the position information on every person at each point in time is acquired from a moving image (a frame) that is captured at each point in time, and in mask image generator 36, the mask image at each point in time is generated from the position information on every person at each point in time. Furthermore, in statistical information acquirer 34, the temporal statistical processing is performed on the position information on every person at each point in time, the statistical information (the staying time and the number of stays) relating to the staying situation of the person is acquired during the target period of time for the statistical processing, and in heat map image generator 35, the heat map image that results from visualizing the statistical information is generated.

On the other hand, in background image generator 38, processing is performed that generates the background image from multiple moving images (frames) that are captured during the target period of time for the statistical processing. That is, a learning period of time for generating the background image is set to be within the target period of time, and the background image is generated from the multiple moving images during the learning period of time. In moving image output controller 39, processing is performed that generates the monitoring moving image that results from superimposing the heat map image and the mask image onto the background image.

In this manner, the mask image is sequentially generated from the position information at each point in time, and in contrast, the heat map image and the background image are generated in accordance with the setting of the target period of time for the statistical processing. Therefore, the monitoring moving image at each point of time results from superimposing the mask image at the point in time, and the heat map image during the target period of time corresponding to the point in time onto the background image during the target period of time corresponding to the point in time.

When the statistical information that is a source of the heat map image is generated, all pieces of position information being obtained from the moving images that are captured during the target period of time may not need to be targets, and pieces of position information on the captured moving images that, during a predetermined period of time, are selected from among the moving images that are captured during the target period of time may be set to be targets.

Figure 13A:
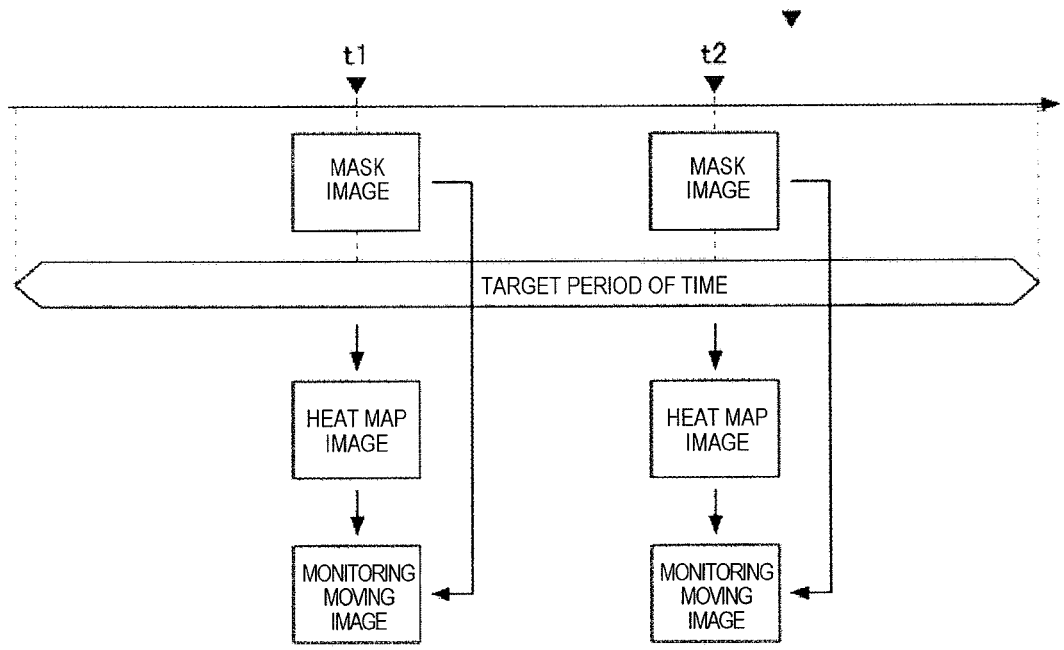
FIG. 13A is an explanatory diagram for describing an outline of the processing that is performed in each unit of the PC.
Figure 13B:
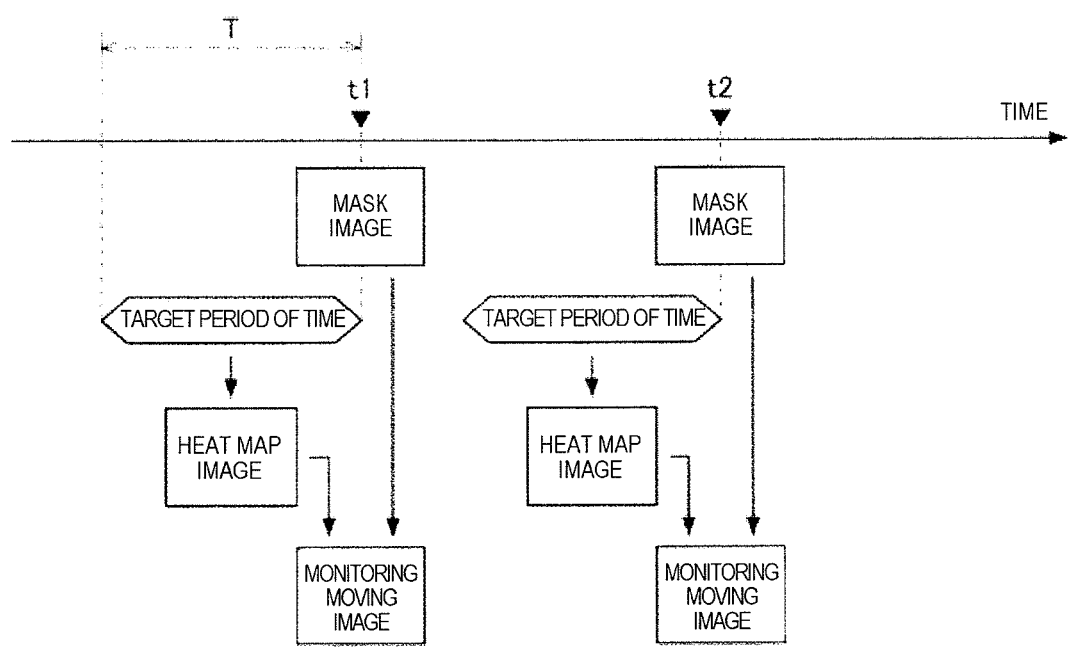
FIG. 13B is an explanatory diagram for describing an outline of the processing that is performed in each unit of the PC.

Next, the target period of time for the statistical processing that is performed in statistical information acquirer 34 which is illustrated in FIG. 6 is described. FIGS. 13A and 13B are explanatory diagrams for describing an outline of processing that is performed in each unit of PC 3.

According to the present embodiment, in moving image output controller 39, processing is performed that, according to the user's input operation that arbitrarily designates the display point in time (a reproduction position) of the monitoring moving image, generates and outputs the monitoring moving image at the designated display point in time. When the monitoring moving images are successively output, the mask images are sequentially generated from the position information on a person at the display point in time, the heat map image is generated from the statistical information that is based on the position information on the person during the target period of time corresponding to the display point in time, and the monitoring moving image that results from superimposing the heat map image and the mask image that are obtained onto the background image is generated.

As is described above, the period-of-time-fixed type in which the target period of time is fixed, and the period-of-time-variable type in which the target period of time is not fixed are available for setting the target period of time for the statistical processing that generates the statistical information that is a source of the heat map image. Two processing methods that result from a difference in setting between the target periods of time are described referring to FIGS. 13A and 13B.

FIG. 13A illustrates an example of the period-of-time-fixed type as the target period of time for the statistical processing. In this case, the mask image changes from moment to moment according to the passage of time. On the other hand, the heat map image results from displaying an image corresponding to a result of accumulating pieces of statistical information that are acquired until a display point in time (t1 or t2) during the target period of time for the statistical processing.

FIG. 13B illustrates an example of the period-of-time variable type as the target period of time for the statistical processing. In the period-of-time variable type, the target period of time is updated in such a manner that the display target in time is an ending point in time of the target period of time. That is, the target period of time is a period of time from a point in time that is always only by a length T (for example, 30 minutes) of the target period of time earlier than the display point in time to the display point in time. In this case, in the same method as illustrated in FIG. 13A, the mask image changes from moment to moment according to the passage of time. On the other hand, the heat map image results from displaying an image corresponding to a result of accumulating only pieces of statistical information that are acquired during the target period of time immediately before the display point in time. In the present example, the period of time from a point in time that is always only by the length T (for example, 30 minutes) earlier than the display point in time to the display point in time is set to be the target period of time, but it is also possible to set a period of time from a point in time that is only by the length T earlier than a point in time that is by a predetermined time earlier than the display point in time to the point in time that is by the predetermined time earlier than the display point in time.

At this point, the period-of-time-fixed type that is illustrated in FIG. 13A assumes a case where the target period of time for the statistical processing of the heat map image is comparatively long and additionally, it is desired to display the mask image as well, and is suitable for a case where a monitoring moving image is generated from the past moving images that are stored in recorder 2 and the generated monitoring moving image is displayed. On the other hand, the period-of-time-variable type that is illustrated in FIG. 13B assumes a case where the target period of time for the statistical processing of the heat map image is comparatively short and additionally, it is desired to display the mask image as well, and is suitable for a case where a monitoring moving image is generated in real time from a current moving image that is captured by camera 1 and the generated monitoring moving image is displayed.

According to the present embodiment, in heat map condition setter 40, as described above, the target period of time is set to be set according to the user's input operation that arbitrarily designates the target period of time for the statistical processing, and the user can freely designate the length (for example, 30 minutes) and the range (for example, 9:00 to 12:00) of the target period of time according to types of target periods of time (the period-of-time-fixed type and the period-of-time-variable type) for the statistical processing.

As described above, according to the present embodiment, in position information acquirer 32, the person is set to be detected from the moving image of the monitoring area and the position information on every person is set to be acquired, in statistical information acquirer 34, the temporal statistical processing is set to be performed on the position information that is acquired by position information acquirer 32 and the statistical information relating to the staying situation of the person is set to be acquired in accordance with the setting of the target period of time for the statistical information, in heat map image generator 35, the heat map image that results from visualizing the statistical information acquired by the statistical information acquirer 34 is set to be generated, in mask image generator 36, the mask image corresponding to the person moving image area is set to be generated at every predetermined point in time based on the position information acquired by position information acquirer 32, and in moving image output controller 39, the monitoring moving image that results from superimposing the heat map image and the mask image that are generated by heat map image generator 35 and mask image generator 36, respectively, onto the background image is set to be generated and output at every predetermined point in time. Accordingly, because the heat map image shows the activity situation of the person over a predetermined period of time, the mask image shows the activity situation of the person at a certain moment, and the heat map image and the mask image are displayed on the monitoring screen at the same time, with one monitoring screen, the user can know the activity situation of the person over the predetermined period of time and the activity situation of the person at the certain moment at the same time.

Furthermore, according to the present embodiment, in mask image regulator (the display form regulator) 37, because the display form of the mask image is set to be changed in such a manner that the confused state where the heat map image and the mask image are confused with each other is detected and the confused state is removed, the difficulty in distinguishing the heat map image and the mask image due to the confused state where the heat map image and the mask image are confused with each other can be avoided. Because of this, the user can reliably know the activity situation of the person over a predetermined period of time and the activity situation of the person at a certain moment. Because the trouble of the user selecting a suitable display form that does not cause the confused state can be saved, the user's convenience can be increased.

Furthermore, according to the present embodiment, in mask image regulator 37, because at least one among the display elements that are the color, the pattern, the contour, and the transmissivity is set to be changed in changing the display form of the mask image, the display form of the mask image is suitably changed, and thus the confused state where the heat map image and the mask image are confused with each other can be reliably avoided.

Furthermore, according to the present embodiment, in mask condition setter (the display form setter) 41, according to the user's input operation, the display form of the mask image is set to be set and the user selects the display form in such a manner that the confused state where the heat map image and the mask image are confused with each other does not occur, and thus the difficulty in distinguishing the heat map image and the mask image due to the confused state can be avoided. Because of this, the user can reliably know the activity situation of the person over a predetermined period of time and the activity situation of the person at a certain moment.

Furthermore, according to the present embodiment, in mask condition setter 41, because the user's input operation relating to the display form is set to be guided in such a manner that the confused state where the heat map image and the mask image are confused with each other does not occur, the trouble of the user selecting the suitable display form that does not cause the confused state can be saved. Because of this, the user's convenience can be increased.

Furthermore, according to the present embodiment, in mask condition setter 41, when the display form of the mask image is set, because the candidates for the display form that are selectable by the user's input operation are made to be limited in such a manner that the confused state where the heat map image and the mask image are confused with each other does not occur, the erroneous selection of the display form that causes the confused state to occur can be avoided.

Furthermore, according to the present embodiment, in mask condition setter 41, because at least one among the display elements that are the color, the pattern, the contour, and the transmissivity is set to be set according to the user's input operation in setting the display form of the mask image, the display form of the mask image is suitably set, and thus the confused state where the heat map image and the mask image are confused with each other can be reliably avoided.

Furthermore, according to the present embodiment, in background image generator 38, the background image is generated in accordance with the setting of the target period of time for the statistical processing, and in moving image output controller 39, the heat map image is set to be superimposed on the background image that is consistent with the heat map image in terms of the target period of time, and the heat map image and the background image are generated from a moving image that has the same target period of time as the heat map image and the background image. Because of this, the heat map image and the background image are aligned with each other, and the user can be prevented from feeling an occurrence of an uncomfortable feeling due to non-alignment of the heat map image and the background image.

Furthermore, according to the present embodiment, in heat map condition setter (the process condition setter) 40, according to the user's input operation that arbitrarily designates the target period of time, the target period of time is set, and in moving image output controller 39, according to the user's input operation that arbitrarily designates the display point in time of the monitoring moving image, the monitoring moving image at the designated display point in time is set to be generated and output. Accordingly, because the user can freely designate the target period of time, with the heat map image, the user can know the activity situation of the person over various periods of time. Furthermore, because the user can freely designate the display point of time of the monitoring moving image, with the mask image, the user can know the activity situation of the person at a necessary point of time.

Second Embodiment

Next, a second embodiment is described. What is not particularly mentioned here is the same as in the first embodiment. FIGS. 14A and 14B are explanatory diagrams illustrating the heat map image that is an area division type according to a second embodiment.

According to the first embodiment, as illustrated in FIGS. 3A and 3B, the target area is set to be within the monitoring area (an area of a moving image of which is captured by camera 1), and the heat map image that results from visualizing the pieces of statistical information (the staying time and the number of stays) on every target area is set to be superimposed onto the background image. However, according to the second embodiment, as illustrated in FIGS. 14A and 14B, all the monitoring areas are set to be the target areas, the target areas are divided into multiple grids (division areas), and the heat map image indicating the statistical information on every grid is set to be superimposed on the background image. With the heat map image, a distribution situation of the statistical information in the monitoring area can be known.

Furthermore, in the heat map image that is the area division type, at least one among the display elements that are the color, the intensity, and the pattern (the design), and the transmissivity is changed for every grid, and thus a numerical value of the statistical information on every grid can be expressed. In examples that are illustrated in FIGS. 14A and 14B, the number of stays in every grid is expressed with color intensity of the grid (intensity of filling color).

In the heat map images that are illustrated in FIGS. 3A and 3B, the two pieces of statistical information, that is, the staying time and the number of stays are visualized with the color intensity of and the size of the heat map image. On the other hand, in the heat map images that are illustrated in FIGS. 14A and 14B, one piece of statistical information, that is, only the number of stays, is visualized, but instead of the number of stays, the staying time may be visualized. Furthermore, the heat map image that results from visualizing the statistical information on the staying time may be independently generated, and may be displayed as a separate monitoring moving image.

Furthermore, in order to generate the heat map image indicating the number of stays, the number of motion lines of a person that passes each grid during the target period of time may be counted and the number of stays in every grid may be obtained. Furthermore, if the staying time for which every person stays during the target period of time is acquired in every grid, the staying time and the number of stays in every grid can be acquired at the same time. Accordingly, the heat map image indicating the number of stays and the heat map image indicating the staying time can be generated at the same time.

Third Embodiment

Figure 15:
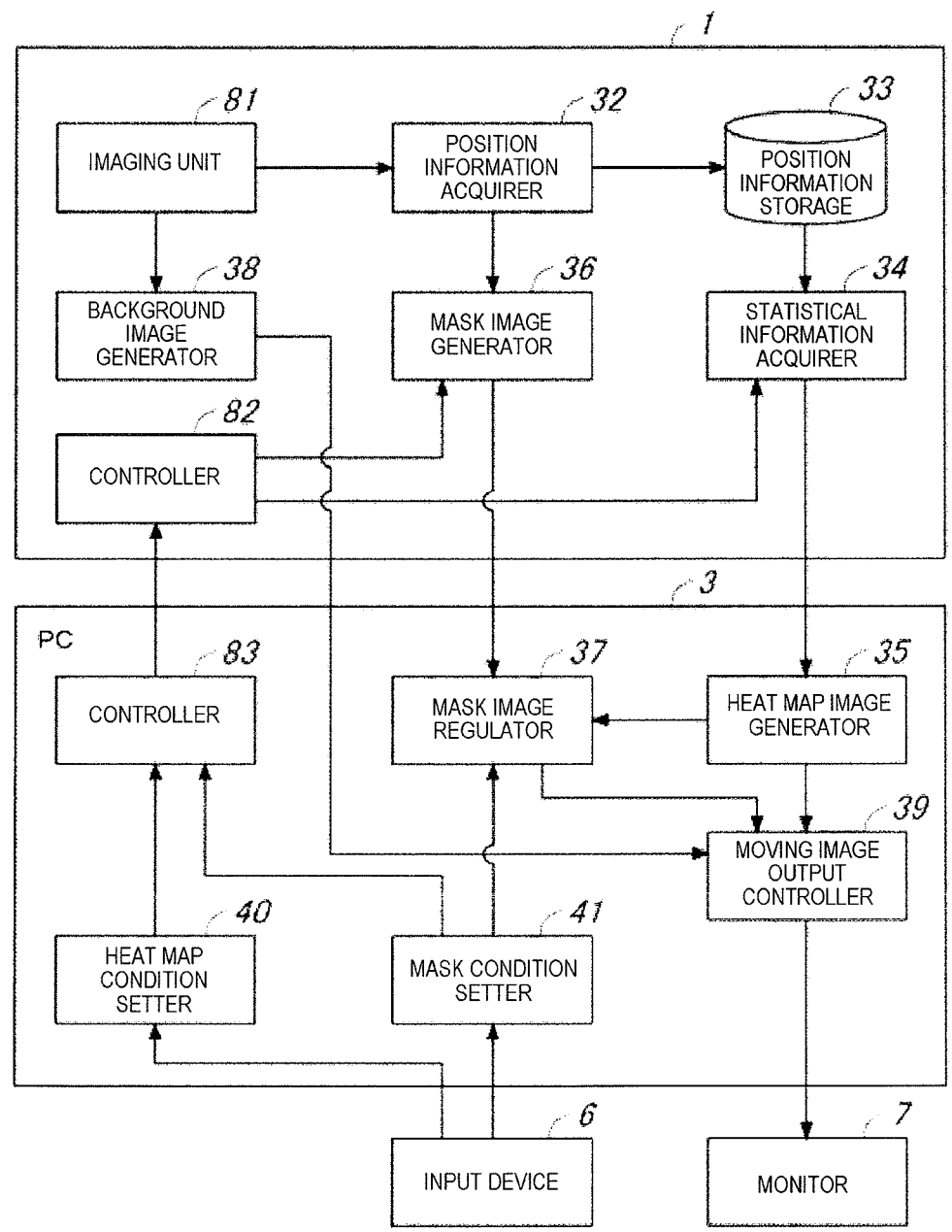
FIG. 15 is a functional block diagram illustrating schematic configurations of the camera and the PC in a monitoring system according to a third embodiment.

Next, a third embodiment is described. What is not particularly mentioned here is the same as in the first embodiment. FIG. 15 is a functional block diagram illustrating schematic configurations of camera 1 and PC 3 in a monitoring system according to the third embodiment.

According to the third embodiment, position information acquirer 32, position information storage 33, statistical information acquirer 34, mask image generator 36, and background image generator 38, which, according to the first embodiment, are provided in PC 3 are provided in camera 1. Imaging unit 81 that has imaging elements and optical elements is provided in camera 1, and a moving image that is output from the imaging unit 81 is input into position information acquirer 32 and background image generator 38. On the other hand, heat map image generator 35, mask image regulator 37, moving image output controller 39, heat map condition setter 40, and mask condition setter 41 are provided in PC 3.

In each unit of camera 1 and PC 3, the same processing as in the first embodiment is performed. However, particularly, according to the third embodiment, the pieces of information that are set in heat map condition setter 40, that is, the pieces of information relating to the target area and the target period of time, and the pieces of information that are set in mask condition setter 41, that is, the pieces of information relating to the display form of the mask image and the like, are sent from controller 83 of PC 3 to controller 82 of camera 1. Based on these pieces of information, predetermined processing is performed in each of the mask image generator 36 and statistical information acquirer 34.

The present invention is described above based on the specific embodiments, but these embodiments are only examples, and the present invention is not limited by these embodiments. Furthermore, all constituent elements of each of the monitoring apparatus, the monitoring system, and the monitoring method according to the embodiments described above, of the present invention, are not necessarily essential, and it is possible to make a selection from among the all constituent elements within a range that does not depart from the scope of the present invention.

For example, according to the embodiments described above, an example of a retail store such as a convenience store is described, but the present invention is not limited to this retail store, and is also applicable to stores that are different from the retail store in terms of types of business, for example, such as a restaurant and a bank. Additionally, it is also possible to apply the present invention to the use in monitoring areas other than the store.

Furthermore, according to the embodiments, an example is described above in which the moving object that is a target for mask processing is defined as a person, but moving objects other than the person, for example, vehicles such as an automobile and a bicycle, may be targets for the mask processing.

Furthermore, according to the embodiments described above, as illustrated in FIG. 2, camera 1 is set to be an omnidirectional camera with a fish-eye lens that has a photographing range of 360 degrees, but it is also possible to adopt a camera with a predetermined angle of view, which is called a box camera.

Furthermore, according to the embodiments described above, because the confused state where the heat map image and the mask image are confused with each other is avoided, in the confusion avoidance processing, that is, in the dynamic display change mode, the display form of the mask image is set to be changed, and in the static display change mode, the candidates for the display form of the mask image are made to be limited. However, a target for the confusion avoidance processing is not limited to the mask image. The heat map image may be set to be the target for the confusion avoidance processing, and both of the heat map image and the mask image may be set to be the target for the confusion avoidance processing.

Furthermore, according to the embodiments described above, in the dynamic display change mode, in a case where the image areas of the heat map image and the mask image overlap each other, the confusion avoidance processing is set to be performed. Even in a case where the image areas of the heat map image and the mask image come into contact with each other, because there is a concern that the heat map image and the mask image will be confused with each other, the confusion avoidance processing may be set to be performed in such a case.

Furthermore, according to the embodiments described above, all the mask images corresponding to each person are set to be displayed in the same display form, but the mask image may be set to be displayed in a different type according to person attributes (sex, age, and the like) and the like. In this case, considering the display form of every mask image, the confusion avoidance processing may be set to be performed in such a manner that the confused state where the heat map image and the mask image are confused with each other does not occur.

Furthermore, according to the embodiments described above, in the static display change mode, the candidates for the display form of the mask image are set to be limited in such a manner that the confused state where the heat map image and the mask image are confused with each other does not occur. However, in the static display change mode, if the user's input operation relating to the display form is guided in such a manner that the confused state does not occur, this may be sufficient, and for example, in a case where the user selects the display form in which there is a concern that the confused state will occur, a warning that such selection is unsuitable, and more specifically, a warning that the confused state will occur, may be set to be output.

Furthermore, according to the embodiment described above, in statistical information acquirer 34, both of the staying time and the number of stays (the number of staying persons) as the pieces of statistical information are set to be acquired, and the heat map image that expresses both of the staying time and the number of stays is set to be displayed, but only one of the staying time and the number of stays may be set to be acquired and the heat map image that expresses only one of the staying time and the number of stays may be set to be displayed.

Furthermore, according to the embodiments described above, the motion line of the person is set to be acquired and the pieces of statistical information (the staying time and the number of stays) are set to be acquired based on the motion line, but this statistical-information acquirement processing is not limited to the statistical information that is based on the motion line. For example, coordinate information relating to a person frame (a rectangular area in which a person is present) may be set to be acquired as the position information on the person, the number of times that every pixel (a detection element) is positioned within the person frame may be set to be counted, a counter value of every pixel may be set to be acquired, suitable statistical processing, for example, averaging may be set to be performed on the counter value of every pixel for aggregation in units of target areas (refer to FIGS. 3A and 3B) or in units of grids (refer to FIGS. 14A and 14B), and thus the statistical information on every target area or on every grid may be set to be acquired. Furthermore, coordinate information relating to a central point of the person frame may be set to be acquired, the number of times that the central point of the person frame is positioned within the target area or the grid may be set to be countered, and thus the statistical information on every target area or on every grid may be set to be acquired.

Furthermore, according to the first embodiment, PC 3 that is provided in the store is set to be caused to perform the processing necessary for monitoring, but PC 11 that is provided in the head office or cloud computer 12 that makes up a cloud computing system, as illustrated in FIG. 1, may be set to be caused to perform the necessary processing. Furthermore, the necessary processing may be shared among multiple information processing apparatuses, and information may be set to be received in multiple information processing apparatuses over a communication medium such as an IP network or a LAN. In this case, the monitoring system is configured from the multiple information processing apparatuses that share the necessary processing.

With this configuration, among processing operations necessary for monitoring, an apparatus that is provided in the store such as PC 3 may be set to be caused to perform processing that requires at least a large amount of computing, for example, person detection processing. With this configuration, because an amount of necessary information data is reduced in remaining processing, even if an information processing apparatus that is installed in a place other than the store, for example, PC 11 that is provided in the head office is set to be caused to perform the remaining processing, a communication load can be reduced. Because of this, management of the system using a wide area network connection type is made easy.

Furthermore, among the processing operations necessary for monitoring, cloud computer 12 may be set to be caused to perform the processing that requires at least a large amount of computing, for example, the person detection processing. With this configuration, an amount of computing is reduced in the remaining processing, a high-speed information processing apparatus is unnecessary on the user side such as the store, and a user-borne cost can be reduced.

Furthermore, cloud computer 12 may be set to be caused to perform all necessary processing operations, or among the necessary processing operations, cloud computer 12 may be set to be caused to share at least moving image output processing. With this configuration, in addition to PCs 3 and 11 that are provided in the store and the head office, respectively, a moving image can be displayed on a portable terminal such as smart phone 13 or tablet terminal 14, and thus a situation that occurs within the store can be checked in an arbitrary place such as a visiting destination other than the store or the head office.

Furthermore, according to the present embodiment, a case where PC 3 that is installed in the store is caused to perform the processing necessary for monitoring, the mask condition setting screen or the monitoring screen is caused to be displayed on monitor 7 of PC 3, and necessary input and output are performed in PC 3 is described, but the necessary input and output may be set to be performed in an information processing apparatus, which is separate from the information processing apparatus that performs the processing necessary for monitoring, for example, the portable terminal such as PC 11 installed in the head office or tablet terminal 14.

Furthermore, in recent years, a 4K television set and the like that, as monitors, pursue high definition have been developed, and by employing a camera corresponding to this 4K television set, person identification capability can be increased. Thus, in an environment where multiple persons are present, the user can easily know behaviors of persons from a mask reproduction moving image.

The monitoring apparatus, the monitoring system, and the monitoring method according to the present invention achieve an effect that enables the user to know the activity situation of the person over a predetermined period of time and the activity situation of the person at a certain moment at the same time, using one monitoring screen, and are useful as the monitoring apparatus, the monitoring system, and the monitoring method, respectively, in each of which the monitoring moving image that results from superimposing the foreground image showing the activity situation of the moving object in the monitoring area onto the background image is generated and is output.

What is claimed is:

1. A monitoring apparatus that generates and outputs a monitoring moving image that results from superimposing a foreground image showing an activity situation of a moving object in a monitoring area onto a background image, the monitoring apparatus comprising:
    a processor;
    a memory in which an instruction is stored;
    a position information acquirer that detects a moving object from a moving image of the monitoring area and acquires position information on every moving object;
    a statistical information acquirer that performs temporal statistical processing on the position information acquired by the position information acquirer and acquires statistical information relating to a staying situation of the moving object in accordance with setting of a target period of time for the statistical processing;
    a first foreground image generator that generates a first foreground image that results from visualizing the statistical information acquired by the statistical information acquirer;
    a second foreground image generator that generates a second foreground image having a shape corresponding to an outline of an image area of the moving object at every predetermined point in time based on the position information acquired by the positional information acquirer;
    a moving image output controller that generates and outputs the monitoring moving image that results from superimposing the first and second foreground images that are generated by the first and second foreground image generators, respectively, onto the background image at every predetermined point in time; and
    a display form regulator that relates to a display form of at least one of the first and second foreground images,
    wherein the position information acquirer, the statistical information acquirer, the first foreground image generator, the second foreground mage generator, the moving image output controller, and the display form regulator are configured to execute the instruction of the processor, and
    wherein the display form regulator detects a confused state where the first and second foreground images are confused with each other, and changes the display form of at least one of the first and second foreground images in such a manner that the confused state is removed.

2. The monitoring apparatus according to claim 1,
    wherein, in changing the display form of at least one of the first and second foreground images, the display form regulator changes at least one among display elements that are a color, a pattern, a contour, and transmissivity and that determine the display form.

3. The monitoring apparatus according to claim 1, further comprising:
    a display form setter that relates to the display form of at least one of the first and second foreground images,
    wherein the display form setter sets the display form of at least one of the first and second foreground images according to a user's input operation.

4. The monitoring apparatus according to claim 3,
    wherein the display form setter guides the user's input operation relating to the display form in such a manner that a confused state where the first and second foreground images are confused with each other does not occur.

5. The monitoring apparatus according to claim 4,
    wherein, when setting the display form of at least one of the first and second foreground images, the display form setter limits candidates for the display form that are selectable by the user's input operation in such a manner that the confused state does not occur.

6. The monitoring apparatus according to claim 3,
    wherein, in setting the display form of at least one of the first and second foreground images, the display form setter sets at least one among display elements that are a color, a pattern, a contour, and transmissivity and that determine the display form, according to a user's input operation.

7. The monitoring apparatus according to claim 1, further comprising:
    a background image generator that generates the background image from the moving image of the monitoring area,
    wherein the background image generator generates the background image in accordance with the setting of the target period of time, and
    wherein the moving image output controller superimposes the first foreground image onto the background image that is consistent with the first foreground image in terms of the target period of time.

8. The monitoring apparatus according to claim 1, further comprising:
a process condition setter that relates to a process that is performed in the statistical information acquirer,
wherein the process condition setter sets the target period of time according to the user's input operation that arbitrarily designates the target period of time, and
wherein, according to the user's input operation that arbitrarily designates a display point in time of the monitoring moving image, the moving image output controller generates and outputs the monitoring moving image at the designated display point in time.

9. The monitoring apparatus according to claim 1, wherein:
the first foreground image is a statistical information map image; and
the second foreground image is a mask image.

10. A monitoring system that generates and outputs a monitoring moving image that results from superimposing a foreground image showing an activity situation of a moving object in a monitoring area onto a background image, the monitoring system comprising:
a camera that captures a moving image of the monitoring area; and
multiple information processing apparatuses,
wherein any one of the multiple information processing apparatuses includes
a processor;
a memory in which an instruction is stored;
a position information acquirer that detects a moving object from a moving image of the monitoring area and acquires position information on every moving object;
a statistical information acquirer that performs temporal statistical processing on the position information acquired by the position information acquirer and acquires statistical information relating to a staying situation of the moving object in accordance with setting of a target period of time for the statistical processing;
a first foreground image generator that generates a first foreground image that results from visualizing the statistical information acquired by the statistical information acquirer;
a second foreground image generator that generates a second foreground image having a shape corresponding to an outline of an image area of the moving object at every predetermined point in time based on the position information acquired by the positional information acquirer;
a moving image output controller that generates and outputs the monitoring moving image that results from superimposing the first and second foreground image that are generated by the first and second foreground image generators, respectively, onto the background image at every predetermined point in time; and
a display form regulator that relates to a display form of at least one of the first and second foreground images,
wherein the position information acquirer, the statistical information acquirer, the first foreground image generator, the second foreground mage generator, the moving image output controller, and the display form regulator are configured to execute the instruction of the processor, and
wherein the display form regulator detects a confused state where the first and second foreground images are confused with each other, and changes the display form of at least one of the first and second foreground images in such a manner that the confused state is removed.

11. The monitoring system according to claim 10, wherein:
the first foreground image is a statistical information map image; and
the second foreground image is a mask image.

12. A monitoring system that generates and outputs a monitoring moving image that results from superimposing a foreground image showing an activity situation of a moving object in a monitoring area onto a background image, the monitoring system comprising:
a camera that captures a moving image of the monitoring area; and
an information processing apparatus,
wherein any one of the camera and the information processing apparatus includes
a position information acquirer that detects a moving object from a moving image of the monitoring area and acquires position information on every moving object;
a statistical information acquirer that performs temporal statistical processing on the position information acquired by the position information acquirer and acquires statistical information relating to a staying situation of the moving object in accordance with setting of a target period of time for the statistical processing;
a first foreground image generator that generates a first foreground image that results from visualizing the statistical information acquired by the statistical information acquirer;
a second foreground image generator that generates a second foreground image having a shape corresponding to an outline of an image area of the moving object at every predetermined point in time based on the position information acquired by the positional information acquirer;
a moving image output controller that generates and outputs the monitoring moving image that results from superimposing the first and second foreground image that are generated by the first and second foreground image generators, respectively, onto the background image at every predetermined point in time; and
a display form regulator that relates to a display form of at least one of the first and second foreground images, wherein the display form regulator detects a confused state where the first and second foreground images are confused with each other, and changes the display form of at least one of the first and second foreground images in such a manner that the confused state is removed.

13. The monitoring system according to claim 12, wherein:
the first foreground image is a statistical information map image; and
the second foreground image is a mask image.

14. A monitoring method of causing an information processing apparatus to perform processing that generates and outputs a monitoring moving image that results from superimposing a foreground image showing an activity situation of a moving object in a monitoring area onto a background image,
wherein an instruction that is executed by a processor of the information processing apparatus and that is stored in a memory includes
detecting a moving object from a moving image of the monitoring area and acquiring position information on every moving object, performing temporal statistical processing on the positional information and acquiring statistical information relating to a staying situation of the moving object in accordance with setting of a target period of time for the statistical processing, generating a first foreground image that results from visualizing the statistical information, generating a second foreground image having a shape corresponding to an outline of an image area of the moving object based on the position information at every predetermined point in time, generating and outputting the monitoring moving image that results from superimposing the first and second foreground images onto the background image, at every predetermined point in time, and detecting a confused state where the first and second foreground images are confused with each other, and changing a display form of at least one of the first and second foreground images in such a manner that the confused state is removed.

15. The monitoring method according to claim 14, wherein:

the first foreground image is a statistical information map image; and the second foreground image is a mask image.

* * * * *